United States Patent
Williamson et al.

(10) Patent No.: US 8,239,749 B2
(45) Date of Patent: Aug. 7, 2012

(54) PROCEDURALLY EXPRESSING GRAPHIC OBJECTS FOR WEB PAGES

(75) Inventors: Richard Williamson, San Leandro, CA (US); David Hyatt, Mountain View, CA (US); John Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 11/144,384

(22) Filed: Jun. 2, 2005

(65) Prior Publication Data

US 2006/0005114 A1 Jan. 5, 2006

Related U.S. Application Data

(60) Provisional application No. 60/583,125, filed on Jun. 25, 2004.

(51) Int. Cl.
*G06F 17/00* (2006.01)

(52) U.S. Cl. ...................................................... 715/211

(58) Field of Classification Search .................. 715/200, 715/211, 205
See application file for complete search history.

(56) References Cited

U.S. PATENT DOCUMENTS

| | | | |
|---|---|---|---|
| 4,752,893 A | 6/1988 | Guttag et al. | |
| 5,168,441 A | 12/1992 | Onarheim et al. | |
| 5,289,574 A | 2/1994 | Sawyer | |
| 5,297,250 A | 3/1994 | Leroy et al. | |
| 5,357,603 A | 10/1994 | Parker | |
| 5,388,201 A | 2/1995 | Hourvitz et al. | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,602,997 A | 2/1997 | Carpenter et al. | |
| 5,638,501 A | 6/1997 | Gough et al. | |
| 5,651,107 A | 7/1997 | Frank et al. | |
| 5,657,049 A | 8/1997 | Ludolph et al. | |
| 5,671,343 A * | 9/1997 | Kondo et al. | 345/419 |
| 5,692,205 A * | 11/1997 | Berry et al. | 715/203 |
| 5,708,764 A * | 1/1998 | Borrel et al. | 345/419 |
| 5,742,285 A | 4/1998 | Ueda | |

(Continued)

FOREIGN PATENT DOCUMENTS

EP 548586 A2 6/1993

(Continued)

OTHER PUBLICATIONS

Rist et al., Customizing Graphics for Tiny Displays of Mobile Devices, Google 2002, pp. 260-268.*

(Continued)

*Primary Examiner* — Cong-Lac Huynh
(74) *Attorney, Agent, or Firm* — Fenwick & West LLP

(57) ABSTRACT

A graphics object can be expressed using procedural language embedded in a markup language document. In a embodiment, a drawing space is specified in markup language. A drawing command to arbitrarily draw a graphics object into the drawing space is specified in procedural language. Interpretation of the markup and procedural language commands results in the rendering of the arbitrary graphics object. In another embodiment, there is a browser comprising a rendering engine, an interpreter, and parser. The rendering engine is configured to interpret a markup language instruction that specifies a drawing space as well as drawing commands in procedural language for drawing an arbitrary graphic object into the drawing space. The parser can then parse the drawing commands and convert them into an execution tree of tree objects.

35 Claims, 6 Drawing Sheets

U.S. PATENT DOCUMENTS

| | | | |
|---|---|---|---|
| 5,754,174 A | 5/1998 | Carpenter et al. | |
| 5,761,673 A * | 6/1998 | Bookman et al. | 719/311 |
| 5,764,229 A | 6/1998 | Bennett | |
| 5,764,238 A | 6/1998 | Lum et al. | |
| 5,781,189 A * | 7/1998 | Holleran et al. | 715/826 |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,838,313 A * | 11/1998 | Hou et al. | 715/201 |
| 5,838,316 A | 11/1998 | Arruza | |
| 5,877,741 A | 3/1999 | Chee et al. | |
| 5,877,762 A | 3/1999 | Young et al. | |
| 5,883,639 A | 3/1999 | Walton et al. | |
| 5,920,659 A | 7/1999 | Iverson et al. | |
| 5,933,148 A | 8/1999 | Oka et al. | |
| 5,949,409 A | 9/1999 | Tanaka et al. | |
| 5,978,579 A | 11/1999 | Buxton et al. | |
| 5,999,948 A | 12/1999 | Nelson et al. | |
| 6,005,568 A | 12/1999 | Simonoff et al. | |
| 6,006,231 A | 12/1999 | Popa | |
| 6,011,562 A | 1/2000 | Gagne et al. | |
| 6,016,145 A * | 1/2000 | Horvitz et al. | 715/788 |
| 6,031,937 A | 2/2000 | Graffagnino | |
| 6,075,543 A | 6/2000 | Akeley | |
| 6,076,166 A * | 6/2000 | Moshfeghi et al. | 726/4 |
| 6,166,748 A | 12/2000 | Van Hook et al. | |
| 6,167,533 A | 12/2000 | Potterveld et al. | |
| 6,182,129 B1 * | 1/2001 | Rowe et al. | 709/221 |
| 6,191,797 B1 | 2/2001 | Politis | |
| 6,195,664 B1 | 2/2001 | Tolfa | |
| 6,211,890 B1 | 4/2001 | Ohba | |
| 6,246,418 B1 | 6/2001 | Oka | |
| 6,266,053 B1 | 7/2001 | French et al. | |
| 6,266,430 B1 | 7/2001 | Rhoads | |
| 6,272,484 B1 | 8/2001 | Martin et al. | |
| 6,272,558 B1 | 8/2001 | Hui et al. | |
| 6,278,448 B1 | 8/2001 | Brown et al. | |
| 6,304,684 B1 | 10/2001 | Niczyporuk et al. | |
| 6,307,574 B1 | 10/2001 | Ashe et al. | |
| 6,321,314 B1 | 11/2001 | Van Dyke | |
| 6,369,823 B2 | 4/2002 | Ohba | |
| 6,369,830 B1 | 4/2002 | Brunner et al. | |
| 6,396,520 B1 | 5/2002 | Ording | |
| 6,411,301 B1 | 6/2002 | Parikh et al. | |
| 6,412,021 B1 | 6/2002 | Nguyen | |
| 6,418,439 B1 * | 7/2002 | Papierniak et al. | 1/1 |
| 6,421,058 B2 | 7/2002 | Parikh et al. | |
| 6,424,348 B2 | 7/2002 | Parikh | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,469,714 B2 | 10/2002 | Buxton et al. | |
| 6,483,524 B1 | 11/2002 | Petchenkine et al. | |
| 6,489,963 B2 | 12/2002 | Parikh et al. | |
| 6,512,522 B1 | 1/2003 | Miller et al. | |
| 6,526,174 B1 | 2/2003 | Graffagnino | |
| 6,542,160 B1 | 4/2003 | Abgrall | |
| 6,544,295 B1 | 4/2003 | Bodnar | |
| 6,552,732 B1 * | 4/2003 | Davis et al. | 345/619 |
| 6,571,328 B2 | 5/2003 | Liao et al. | |
| 6,577,317 B1 | 6/2003 | Duluk, Jr. et al. | |
| 6,580,430 B1 | 6/2003 | Hollis et al. | |
| 6,583,892 B2 * | 6/2003 | Tanaka | 358/1.9 |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,664,958 B1 | 12/2003 | Leather et al. | |
| 6,664,962 B1 | 12/2003 | Komsthoeft et al. | |
| 6,668,353 B1 * | 12/2003 | Yurkovic | 715/205 |
| 6,674,438 B1 | 1/2004 | Yamamoto et al. | |
| 6,684,369 B1 * | 1/2004 | Bernardo et al. | 715/205 |
| 6,691,176 B1 * | 2/2004 | Narin et al. | 719/318 |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,715,053 B1 | 3/2004 | Grigor | |
| 6,717,599 B1 | 4/2004 | Olano | |
| 6,734,864 B2 | 5/2004 | Abgrall | |
| 6,741,242 B1 * | 5/2004 | Itoh et al. | 345/419 |
| 6,765,592 B1 | 7/2004 | Pletcher et al. | |
| 6,788,318 B2 | 9/2004 | Chen | |
| 6,806,892 B1 | 10/2004 | Plow et al. | |
| 6,906,720 B2 | 6/2005 | Emberling et al. | |
| 6,910,000 B1 | 6/2005 | Yedidia et al. | |
| 6,911,984 B2 | 6/2005 | Sabella et al. | |
| 6,931,633 B1 | 8/2005 | Vazquez et al. | |
| 6,944,829 B2 | 9/2005 | Dando | |
| 6,978,418 B1 * | 12/2005 | Bain et al. | 715/205 |
| 6,993,721 B2 | 1/2006 | Rosin et al. | |
| 7,016,011 B2 | 3/2006 | De Haan | |
| 7,020,687 B2 * | 3/2006 | Mooney et al. | 709/206 |
| 7,024,381 B1 | 4/2006 | Hastings et al. | |
| 7,027,055 B2 | 4/2006 | Anderson et al. | |
| 7,028,264 B2 | 4/2006 | Santoro et al. | |
| 7,050,955 B1 | 5/2006 | Carmel et al. | |
| 7,085,994 B2 | 8/2006 | Gvily | |
| 7,103,833 B1 * | 9/2006 | Sano et al. | 715/206 |
| 7,127,713 B2 | 10/2006 | Davis et al. | |
| 7,174,512 B2 | 2/2007 | Martin et al. | |
| 7,240,300 B2 * | 7/2007 | Jaeger | 715/863 |
| 7,281,202 B2 | 10/2007 | Croney et al. | |
| 7,315,848 B2 | 1/2008 | Pearse et al. | |
| 7,559,034 B1 * | 7/2009 | Paperny et al. | 715/803 |
| 7,667,582 B1 * | 2/2010 | Waldorf | 340/440 |
| 7,975,231 B2 * | 7/2011 | Hasuike et al. | 715/760 |
| 2001/0030647 A1 | 10/2001 | Sowizral et al. | |
| 2001/0035885 A1 | 11/2001 | Iron et al. | |
| 2002/0008719 A1 * | 1/2002 | Miyawaki et al. | 345/764 |
| 2002/0033837 A1 * | 3/2002 | Munro | 345/654 |
| 2002/0065949 A1 | 5/2002 | Heaton | |
| 2002/0067418 A1 | 6/2002 | I | |
| 2002/0072956 A1 * | 6/2002 | Willems et al. | 705/10 |
| 2002/0089526 A1 | 7/2002 | Buxton et al. | |
| 2002/0093516 A1 | 7/2002 | Brunner et al. | |
| 2002/0099678 A1 | 7/2002 | Albright et al. | |
| 2002/0118217 A1 | 8/2002 | Fujiki | |
| 2002/0120673 A1 | 8/2002 | Tolson et al. | |
| 2002/0129092 A1 | 9/2002 | Tolson et al. | |
| 2002/0171682 A1 | 11/2002 | Frank et al. | |
| 2002/0174003 A1 | 11/2002 | Redmann et al. | |
| 2002/0174181 A1 | 11/2002 | Wei | |
| 2002/0186257 A1 | 12/2002 | Cadiz et al. | |
| 2003/0009267 A1 | 1/2003 | Dunsky et al. | |
| 2003/0020671 A1 | 1/2003 | Santoro et al. | |
| 2003/0023770 A1 * | 1/2003 | Barmettler et al. | 709/327 |
| 2003/0046316 A1 | 3/2003 | Gergic et al. | |
| 2003/0080995 A1 | 5/2003 | Tenenbaum et al. | |
| 2003/0101046 A1 | 5/2003 | Krasnov | |
| 2003/0123739 A1 | 7/2003 | Graffagnino | |
| 2003/0124502 A1 * | 7/2003 | Chou | 434/350 |
| 2003/0146934 A1 | 8/2003 | Bailey et al. | |
| 2003/0154239 A1 | 8/2003 | Davis et al. | |
| 2003/0158975 A1 | 8/2003 | Frank et al. | |
| 2003/0164831 A1 * | 9/2003 | Walls et al. | 345/505 |
| 2003/0164862 A1 | 9/2003 | Cadiz et al. | |
| 2003/0174136 A1 | 9/2003 | Emberling et al. | |
| 2003/0174154 A1 | 9/2003 | Yukie et al. | |
| 2003/0184552 A1 * | 10/2003 | Chadha | 345/581 |
| 2003/0189597 A1 | 10/2003 | Anderson et al. | |
| 2003/0191799 A1 | 10/2003 | Araujo et al. | |
| 2003/0225740 A1 * | 12/2003 | Sexton et al. | 707/1 |
| 2004/0012626 A1 | 1/2004 | Brookins | |
| 2004/0032409 A1 | 2/2004 | Girard | |
| 2004/0036711 A1 | 2/2004 | Anderson | |
| 2004/0039987 A1 * | 2/2004 | Coppin et al. | 715/502 |
| 2004/1003993 | 2/2004 | Land et al. | |
| 2004/0143823 A1 * | 7/2004 | Wei | 717/140 |
| 2004/0179019 A1 | 9/2004 | Sabella et al. | |
| 2004/0194020 A1 * | 9/2004 | Beda et al. | 715/502 |
| 2004/0212640 A1 | 10/2004 | Mann et al. | |
| 2004/0215740 A1 | 10/2004 | Frank et al. | |
| 2004/0223003 A1 | 11/2004 | Heirich et al. | |
| 2004/0255253 A1 | 12/2004 | Marcjan | |

| | | |
|---|---|---|
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0057497 A1 | 3/2005 | Kawahara |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0091571 A1* | 4/2005 | Leichtling ............... 715/500 |
| 2005/0091576 A1* | 4/2005 | Relyea et al. ............ 715/502 |
| 2005/0108364 A1* | 5/2005 | Callaghan et al. ........ 709/219 |
| 2005/0144563 A1 | 6/2005 | Hough et al. |
| 2005/0168471 A1 | 8/2005 | Paquette |
| 2005/0168476 A1 | 8/2005 | Levene et al. |
| 2005/0181349 A1* | 8/2005 | Bardige et al. ............ 434/362 |
| 2005/0193368 A1 | 9/2005 | Becker et al. |
| 2005/0240857 A1 | 10/2005 | Benedict et al. |
| 2005/0243373 A1* | 11/2005 | Silverbrook et al. ...... 358/1.18 |
| 2005/0256940 A1 | 11/2005 | Henderson et al. |
| 2005/0268215 A1* | 12/2005 | Battagin et al. ........... 715/503 |
| 2005/0278651 A1 | 12/2005 | Coe et al. |
| 2005/0283734 A1 | 12/2005 | Santoro et al. |
| 2006/0035710 A1* | 2/2006 | Festejo et al. ............. 463/36 |
| 2006/0059422 A1* | 3/2006 | Wu et al. .................. 715/513 |
| 2006/0059423 A1* | 3/2006 | Lehmann et al. ......... 715/530 |
| 2006/0075141 A1 | 4/2006 | Boxenhorn |
| 2006/0090137 A1* | 4/2006 | Cheng et al. .............. 715/758 |
| 2006/0109275 A1* | 5/2006 | Cho ........................... 345/522 |
| 2006/0123356 A1 | 6/2006 | Sobeski et al. |
| 2006/0136843 A1* | 6/2006 | Shafron .................... 715/826 |
| 2006/0136868 A1* | 6/2006 | Celi et al. ................. 717/106 |
| 2006/0206835 A1 | 9/2006 | Chaudhri et al. |
| 2006/0274086 A1 | 12/2006 | Forstall et al. |
| 2006/0277469 A1 | 12/2006 | Chaudhri et al. |
| 2006/0277481 A1 | 12/2006 | Forstall et al. |
| 2007/0038934 A1 | 2/2007 | Fellman |
| 2007/0044039 A1 | 2/2007 | Amadio et al. |
| 2007/0061724 A1 | 3/2007 | Slothouber et al. |
| 2007/0073641 A1* | 3/2007 | Perry et al. ............... 707/2 |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall et al. |
| 2007/0101297 A1 | 5/2007 | Forstall et al. |
| 2007/0101433 A1 | 5/2007 | Louch et al. |
| 2007/0118813 A1 | 5/2007 | Forstall et al. |
| 2007/0130541 A1 | 6/2007 | Louch et al. |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0233736 A1 | 10/2007 | Xiong et al. |
| 2007/0266093 A1 | 11/2007 | Forstall et al. |
| 2008/0072157 A1* | 3/2008 | Pally ......................... 715/738 |
| 2008/0136822 A1* | 6/2008 | Schorr et al. .............. 345/441 |
| 2008/0163076 A1* | 7/2008 | Reponen et al. ........... 715/760 |
| 2008/0209008 A1* | 8/2008 | Kim et al. ................. 709/219 |
| 2008/0306933 A1* | 12/2008 | Valliani et al. ............ 707/5 |
| 2009/0007160 A1* | 1/2009 | Wei ........................... 719/328 |
| 2009/0077158 A1* | 3/2009 | Riley et al. ................ 709/202 |

FOREIGN PATENT DOCUMENTS

| | | |
|---|---|---|
| EP | 0694879 A2 | 1/1996 |
| EP | 1383080 A1 | 1/2004 |
| EP | 0 972 273 B1 | 3/2004 |
| WO | WO 98/45815 | 10/1998 |
| WO | WO 02/09039 A2 | 1/2002 |
| WO | WO 2004/027707 A2 | 4/2004 |

OTHER PUBLICATIONS

Linton et al., Composing User Interfaces with InterViews, IEEE 1989, pp. 8-22.*

Nigay et al., A Design Space for Multimodal Systems: Concurrent Processing and Data Fusion, ACM Apr. 1993, pp. 172-178.*

Billinghurst et al., 3D Palette: A Virtual Reality Content Creation Tool, ACM 1997, pp. 155-156.*

Yee, Peephole Displays: Pen Interaction on Spatially Aware Handheld Computers, ACM 2003, pp. 1-8.*

Duce et al., Web 2D Graphics File Formats, Google 2002, pp. 43-65.*

Lin et al., DENIM: Finding a Tigher Fit between Tools and Practice for Web Site Desigh, ACM 2000, pp. 510-517.*

Jern, 3D Data Visualization on the Web, IEEE 1998, pp. 90-99.*

Microsoft Corporation, User's Guide Microsoft® Windows™ and MS-Dos® 6, 1993, pp. Cover-xvi, 112-121.

Microsoft Corporation, Microsoft® Windows™ User's Guide for the Windows Graphical Environment, Version 3.0 for the MS-DOS® or PC-DOS Operating System, 1990, Document No. SY06851-0290, pp. Cover-vii, 15-76, 315-354.

Conner, D., et al. "Three-Dimensional Widgets," ACM, 1992, pp. 183-231.

"Stardock News: DesktopX User Manual On-line," 1999, 2003, [online] [Retrieved on May 11, 2007] Retrieved from the Internet <URL:http://www.stardock.com/newsitem.asp?id=538>.

"Comparison of widget engines" Wikipedia, 2007 [online] [Retrieved on Sep. 28, 2007] Retrieved from the Internet <URL: http://en.wikipedia.org/wiki/Comparison_of_widget_engines>.

"Dashboard Blog," Dec. 2003 [online] [Retrieved on May 11, 2007] Retrieved from the Internet <URL:http://www.nat.org/dashboard/blog.php3>.

Stardock.com, et al., "DesktopX Whitepaper and Users Guide," Stardock.com, et al., 1999 [online] [Retrieved on May 14, 2007] Retrieved from the Internet <URL:http://www.stardock.net/media/whitepaper_desktopx.html>.

"Windows Sidebar" Wikipedia, 2007 [online] [Retrieved on May 29, 2007] Retrieved from the Internet <URL: http://en.wikipedia.org/wiki/Windows-Sidebar>.

Gruber, J., et al., "Dashboard vs. Konfabulator," Daring Fireball, Jun. 2004, [online] [Retrieved on May 11, 2007] Retrieved from the Internet <URL:http://daringfireball.net/2004/06/dashboard_vs._konfabulator>.

"Snippets Software Platform," Snippet Software Inc., Jun. 2001, [online] [Retrieved on Jun. 11, 2001] Retrieved from the Internet <URL:http://www.snippets.com/products/>.

Snippet Software Inc. et al., "Product Spotlight Non-browser based portal solution from Snippets Software, Inc.," Corporate Portal Letter, Oct. 2000, 3 Pages, vol. 1, No. 10.

Akeley, Kurt et al., "Real-Time Graphics Architecture," The OpenGL® Graphics System, CS448 Lecture 15 [online] Fall, 2001Retrieved from the Internet: <URL: http://www.graphics.stanford.edu/courses/cs448a-01-fall>, pp. 1-20.

Cadiz, JJ et al., "Sideshow: Providing Peripheral Awareness of Important Information," Technical Report MSR-TR-2001-83, Sep. 14, 2001, Microsoft Corporation, Redmond, WA, 9 pages.

Elliott, Conal, "Programming Graphics Processors Functionally," 11 pages.

Nvidia, "Cg—Teaching Cg," Power Point Presentation, Author and date unknown, pp. 1-16.

Segal, Mark et al., "The OpenGL® Graphics System: A Specification (Version 1.5)," Silicon Graphics, Inc., Oct. 30, 2003, 334 pages.

Shantzis, Michael A., "A Model for Efficient and Flexible Image Computing," Computer Graphics Proceedings, Annual Conference Series, Jul. 24-29, 1994, pp. 147-154, Orlando, FL.

Van Gelder, Allen et al., "Direct Volume Rendering with Shading Via Three-Dimensional Textures," University of California, Santa Cruz, CA, 9 pages.

Fried, Ina, "Developer Calls Apple's Tiger a Copycat," CNET News. com, Jun. 28, 2004 [online] [Retrieved on Jul. 1, 2004] Retrieved from the Internet<URL:http://zdnet.com.com/2102-1104_2-250692.html?tag=printthis>.

Fried, Ina, "For Apple's Tiger, the Keyword is Search," CNET News. com, Jun. 28, 2004 [online] [Retrieved on Jul. 1, 2004] Retrieved from the Internet<URL:http://zdnet.com.com/2102-1103_2-250346.html?tag=printthis>.

Haeberli, P. et al., "The Accumulation Buffer: Hardware Support for High-Quality Rendering," Computer Graphics, Aug. 1990, pp. 309-318, vol. 24, No. 4.

International Search Report, PCT/US2005/008804, Jul. 27, 2005, 3 pages.

International Search Report, PCT/US2005/008805, Aug. 8, 2005, 3 pages.
Konfabulator, "Cupertino, Start Your Photocopiers!," [online] [Retrieved on Jul. 1, 2004] Retrieved from the Internet<URL: http://www.konfabulator.com>.
Konfabulator, Konfabulator & Widget Basics, [online] [Retrieved on Jul. 1, 2004] Retrieved from the Internet<URL: http://www.konfabulator.com/info/basics.html>.
Konfabulator, "Screenshots," [online] [Retrieved on Jul. 1, 2004] Retrieved from the Internet<URL:http://www.konfabulator.com/info/screenshots.html>.
Konfabulator, "What is Konfabulator?," [online] [Retrieved on Jul. 1, 2004] Retrieved from the Internet<URL:http://www.konfabulator.com/info/>.
Notification of Transmittal of the International Search Report and the Written Opinion of the International Searching Authority, PCT/US2005/022579, 14 pages.
Puder, A., "Extending Desktop Applications to the Web," ACM International Conference Proceedings Series, Proceedings of the 2004 International Symposium on Information and Communication Technologies, 2004, vol. 90, 6 pages.
Rochkind, M. et al., "Common Elements in Today's Graphical User Interfaces: The Good, the Bad, and the Ugly," INTERCHI '93, ACM, Apr. 24-29, 1993, pp. 470-473.
Shiozawa, Hidekazu et al., "Perspective Layered Visualization of Collaborative Workspaces," Proceedings of the International ACM SIGGROUP conference on Supporting Group Work Publisher, Nov. 1999.
Staples, Loretta, "Representation in Virtual Space: Visual Convention in the Graphical User Interface," Proceedings of the SIGCHI Conference on Human Factors in Computing Systems, Apr. 1993.
Tang, J.C. et al., "ConNexus to Awarenex: Extending Awareness to Mobile Users," SIGCHI '01, ACM, Mar. 31-Apr. 4, 2001, 8 pages.
Wardell, Brad, Konfabulator for Windows, Jan. 10, 2004; [online]Retireved from the Internet Mar. 6, 2006] Retrieved from the Internet:<URL: http://www.xpthemes.com/forums.asp?MID=19&CMID=19&AID=4472>.
"Writing a Desk Accessory," Developer Connection, Apple Computer, Inc. Jul. 3, 1996, [online] [Retrieved on Jan. 3, 2006] Retrieved from the Internet<URL:http://developer.apple.com/documentation/mac/Devices/Devices-16>.

International Search Report and Written Opinion, PCT/US2005/022152, Jul. 10, 2006, 8 pages.
Archive of "Objects, Images and Applets," W3C Recommendation, Feb. 10, 2003, [online] [Archived by http://archive.org; Retrieved on Apr. 13, 2006] Retrieved from the Internet<URL:http://web.archive.org/web/20030210154019/http://www.w3.org/TR/REC-html140/struct/objects.html>.
Ullenboom, C., "Java is auch eine Insel," 2003, [online] [Retrieved on Apr. 13, 2006] Retrieved from the Internet<URL:http://www.galileocomputing.de/openbook/javainsel2//java_140000.htm#Xxx998138>.
Altman, R. B., "Visual QuickStart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.
Stardock et al., "DesktopX General Guide," Aug. 2000, [online] [Retrieved on Jan. 31, 2008] Retrieved from the internet <URL:http://www.stardock.com/products/desktopx/docs/>.
Stardock et al., "DesktopX WhitePaper," Aug. 2000, [online] [Retrieved on Jan. 31, 2008] Retrieved from the internet <URL:http://www.stardock.net/media/whitepaper_desktopx.html>.
Stardock et al., "DesktopX Tutorial," Aug. 2000, [online] [Retrieved on Jan. 31, 2008] Retrieved from the internet <URL:http://www.stardock.com/products/desktopx/tutorial.html>.
Stardock et al., "What Can It Do? Making Objects," DesktopX Tutorial, 2001, [online] [Retrieved on Apr. 11, 2008] Retrieved from the Internet <URL:http://web.archive.org/web/20011019222825/http://www.stardock.com/products/desktopx/...>.
Snippets Software et al., "Products: Overview," Feb. 2002, [online] [Retrieved on Feb. 5, 2008] Retrieved from the Internet URL:http://web.archive.org/web/20020206061508/http://www.snippets.com/products/>.
Unknown, "Convert just about Anything to Anything else," OnlineConversion.com, Aug. 2000, [online] [Retrieved on Jun. 22, 2008] Retrieved from the internet <URL:http://web.archive.org/web/20000815055422/http://www.onlineconversion.com/>.
Examiner's First Report on Australian Patent Application No. 2005267626, Feb. 10, 2010, 3 Pages.
Communication of the European Patent Office dated Oct. 1, 2010, for European Patent Application No. EP05766079.7, 5 pages.

* cited by examiner

San Francisco

Honk Kong

PROCEDURALLY EXPRESSING GRAPHIC OBJECTS FOR WEB PAGES

CROSS-REFERENCE TO RELATED APPLICATIONS

This application claims the benefit of U.S. Provisional Patent Application 60/583,125 entitled "Procedurally Expressing Graphic Objects for Web Pages", to Williamson, et. al. filed Jun. 25, 2004, which is hereby incorporated by reference in its entirety; this application is related to U.S. patent application Ser. No. 10/877,968 entitled "Unified Interest Layer For User Interface", to Chaudhri, et. al. filed Jun. 25, 2004, which is hereby incorporated by reference in its entirety.

BACKGROUND

1. Field of the Invention

The present disclosure relates in general to computer graphics and in particular to procedurally expressing arbitrary graphic objects in markup language documents.

2. Background of the Invention

Web pages are created using markup languages such as HTML (HyperText Markup Language), XHTML (Extensible HyperText Markup Language), and SGML (Standard Generalized Markup Language). Designed to be interpreted by different browsers, markup languages allow for a diversity of content to be expressed in a relatively simple and static code structure. While powerful, markup languages are often not well-suited for supporting dynamic, scalable, and complex graphics. As a result, most website images comprise rasterized graphic objects using such formats as .GIF or .JPEG.

Graphic formats such as vector graphics offer a number of advantages over rasterized graphics. Vector graphic images are generated by interpreting a series of vectors, or path descriptions, and stroking or filling those paths. The resulting images are fully resolution-independent and scalable and therefore, unlike rasterized images, can be scaled up or enlarged while maintaining the same quality. Formats for three-dimensional graphics like OpenGL and Direct3D as well as other formats currently offered and under development are similarly procedural in nature, and thus are not naturally described in markup language. In addition to being scalable, vector graphics and related graphic formats also allow for dynamic rendering. This capability allows for interactivity and also permits equivalent files to be more compact since graphical images and scenes are generated just prior to their display.

These and other benefits make vector graphics, OpenGL, and other formats well-suited for use in web pages. However, existing approaches to providing such arbitrary formats on the web have significant drawbacks. Flash vector graphic files, for instance, are bulky and typically can't be accessed unless the user downloads a plug-in containing a rendering engine equipped with special capabilities. Previous attempts to create a 3D markup language, notably VRML (Virtual Reality Modeling Language) have as yet been unsuccessful. In addition, many graphics concepts such as iteratively drawing paths are more naturally described in procedural language rather than using the markup interface such as that used by VRML or SVG. Although adding procedural commands, scripted for instance in JavaScript, to web pages may enable the dynamic manipulation of images, it still does not allow for the drawing of arbitrary images into a web page or confer the other advantages associated with arbitrary graphic formats. Thus, what is needed is a way to leverage existing graphics and rendering capabilities using a procedural interface to create graphics objects for use in websites.

SUMMARY OF THE INVENTION

The present invention relates to a novel approach to creating graphics object for website applications. As used throughout this disclosure, the term "arbitrary graphics object" or AGO refers to any graphical output rendered procedurally, including, but not limited to, a two or three dimensional image or scene, produced based on the execution of procedural commands. The execution of the commands may be carried out in a graphics context that supports vector graphics, Scalable Vector Graphics, OpenGL or other types of existing and emerging graphics platforms, or may also utilize more conventional graphics formats such as Postscript, TIFF, PDF, PICT, BMP, WMF, GIF, JPEG, PNG, and EPS.

In an embodiment, a drawing area into which anything can be drawn using drawing commands is described in a markup language. The AGO is then expressed in the form of arbitrary drawing commands, such as those provided in vector graphics, to draw into the drawing area. According to one embodiment of the invention, a markup language, such as HTML, is used to specify a graphical element, referred to throughout the disclosure as a "canvas." A procedural language such as JavaScript is used to draw into that graphical element. Also created is a context object that can render into the canvas using a paintbrush-like metaphor. Any graphics language can be use to specify the graphical content to be drawn within the element or canvas; such language can include vector graphics commands such as pathing, stroking, and filling. The canvas itself may also be manipulated in terms of other markup constructs such as Content Style Sheets (CSS). During an event loop, the procedural commands are translated into graphics code, which is executed to dynamically generate the graphics object. The object is then composited for display. This series of steps can be used to arbitrarily render scenes and images on the fly using graphics concepts such as masking, pathing, and transparency. The resulting arbitrary graphics object may be resolution-independent and fully scalable, often consumes less space than conventional graphics elements, and can utilize existing and emerging graphics and rendering capabilities.

Although reference throughout this disclosure is made to particular operating platforms, graphics, web browsers, and such technologies, the methods and systems of this disclosure may be advantageously implemented using a variety of existing and emerging graphics, browser, and related technologies in a variety of different operating environments.

In an embodiment, an arbitrary graphics object is expressed in computer code. A drawing space is specified in a markup language, and a drawing command is specified in a procedural language to draw the arbitrary graphics object into the drawing space. In another embodiment, there is a computer program product comprising instructions for specifying a graphics object. The instructions include a command in markup language for defining a drawing space, and a command in scripting language for drawing the arbitrary graphic object. In an embodiment, there is also an instruction for specifying a command in the procedural language to retrieve the drawing space.

In another embodiment, a graphics object can be expressed using an interactive user interface. In response to input from the user, a markup language command that specifies a height dimension and a width dimension of a drawing space is coded. In addition, scripting language commands are coded for arbitrarily drawing the graphics object in the drawing space, responsive to user input representing the object.

DETAILED DESCRIPTION OF THE PREFERRED EMBODIMENTS

Operating Environment

Figure 1:
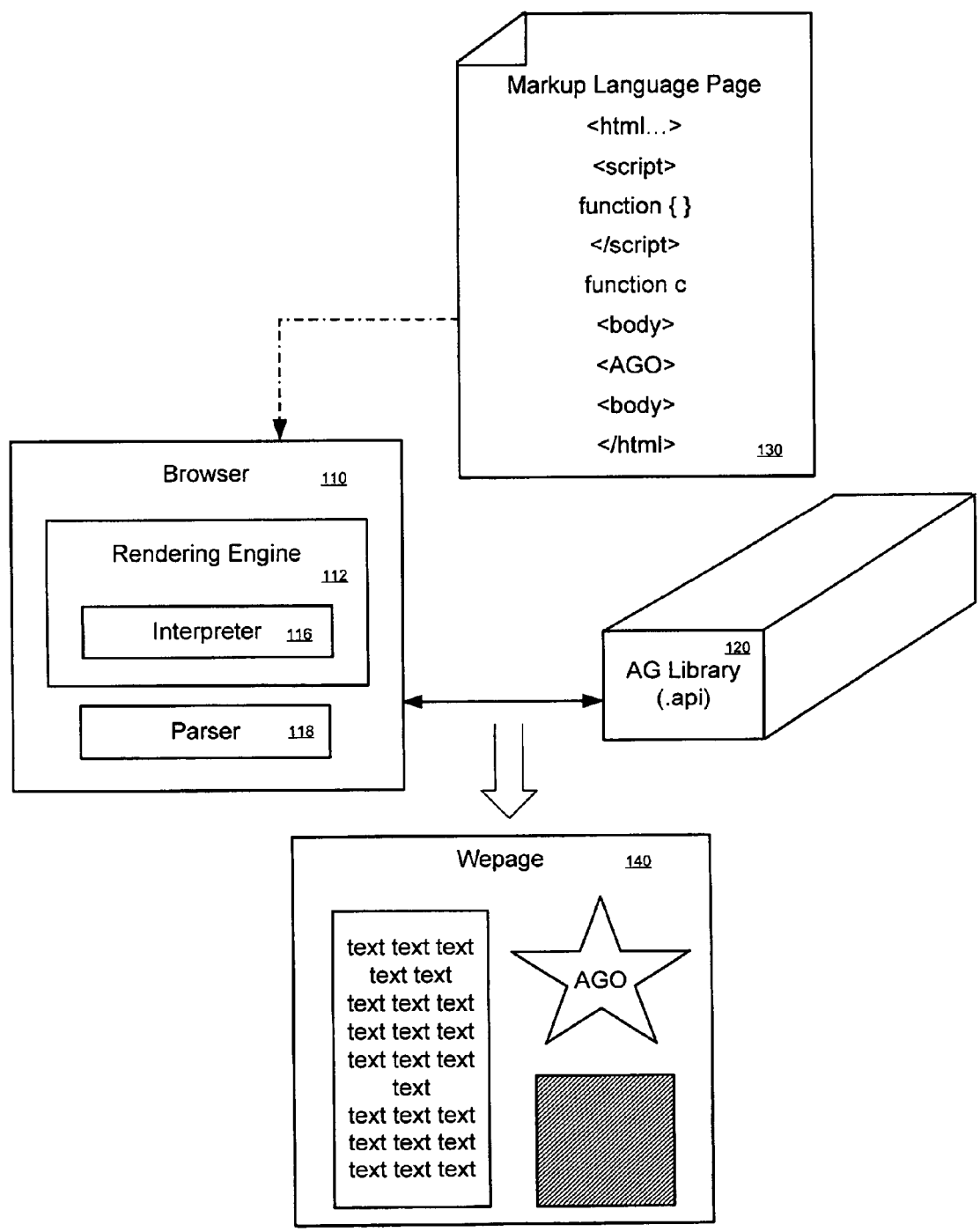
FIG. 1 depicts a high level view of the operating environment in and elements with which a graphics object can be expressed in accordance with an embodiment of the invention.

FIG. 1 depicts a high level view of the operating environment in which an arbitrary graphics object can be procedurally expressed in accordance with an embodiment of the invention. Shown in FIG. 1 are a browser 110, an arbitrary graphics library (AGL) 120, a markup language page 130, and a webpage 140. The browser 110 is a conventional or emerging browser such as a Safari, Netscape, IE Explorer, or Mozilla browser, and contains a rendering engine 112, interpreter 116, and a parser 118. The AGL 120 is a library of commands associated with an arbitrary graphics (AG) format such as vector graphics, OpenGL, or other graphic library exposed with an application interface. The markup language page 130, to be interpreted by the browser 110, contains a description of an arbitrary graphics object (AGO) and is written in any conventional or emerging markup language such as HTML, XHTML, or XML (extensible markup language).

Contained in the page is a markup language tag identifying the AGO and commands written in a procedural language (PL) such as Javascript, Visual Basic, or Python, that describe how the AGO is to be generated. The page may also contain formatting or other commands in CSS or other markup language construct to describe how the AGO is to be rendered. The browser 110 executes the markup language page, using in part calls from the AGL 120, and produces the web page containing the AGO. In an embodiment, the AGO comprises additional content described in markup language. The content may comprise any text, web content, a graphics element, or non-graphical content. This content may be described in markup or procedural language, as discussed below in reference to FIG. 2. The browser 110 executes the language describing the content as part of the markup page, retrieving or passing in the content as needed.

As one of skill in the art would know, one or more elements of FIG. 1 including the browser 110 and markup language page 130 may be displayed, coded, created or processed on one or more hardware elements. Similarly, one or more of the step and methods described in this specification may be carried out using such elements. Such hardware components, such as a display device, processor, and an input device such as a keyboard or mouse, including their operation and interactions with one another and with a central processing unit of the personal computer, are well known in the art of computer systems and therefore are not depicted here. In addition, although the methods described herein are primarily disclosed in the context of a browser, in various alternatives they may be carried out by various computer or other applications including an application for a desktop, laptop, or handheld computer or handheld device, a game application, or a graphics application. In another embodiment, an application that can interpret one or more markup languages such as HTML, XHTML, and XML may be used.

As described above, the browser 110 includes a rendering engine 112, an interpreter 116, and a parser 118. The rendering engine 112 is built on conventional or emerging rendering and layout engine technology such as used by the Gecko engine of Mozilla, or Webkit of OSX and interprets and renders the markup page. The rendering engine 112 includes an interpreter 116 for interpreting the PL and for interpreting the markup instructions contained on the markup page 130 into an intermediate form for execution. Specifically, the interpreter 116 can translate the PL code describing the AGO into AG commands from the AG library 120 in order to create and render the AGO. The interpreter 116 may accomplish this translation with reference to a mapping that correlates PL to AG code. The browser 110 also contains a parser 118 that will parse the markup source and create an element for the AGO in an object tree. The rendering engine 112 interfaces with the AGL 120 in order to output the AGO. The AGL 120 is a graphics library that contains graphics calls for generating 2-D or 3-D graphics images. For instance, in the Mac OSX environment, the AGL could comprise the CoreGraphics library. On the other hand, if a Mozilla browser is being used, the AGL could comprise a library of calls to an abstract, platform-independent, vector graphics language for doing low-level rendering operations. Other exemplary graphics languages include GDI on Windows. The AGL 120 may reside in the operating environment of the browser and/or may be connected to the browser through an abstraction layer of the browser. The AGL 120 supplies calls to the browser that can then be interpreted by the interpreter to generate a 2-D or 3-D image, scene, or other graphics object. How the browser 110 and AGL execute the markup language page 130 to generate the web page output containing the AGO is be described in greater detail with reference to FIGS. 3 and 4 below.

Expression of an AGO

Figure 2:
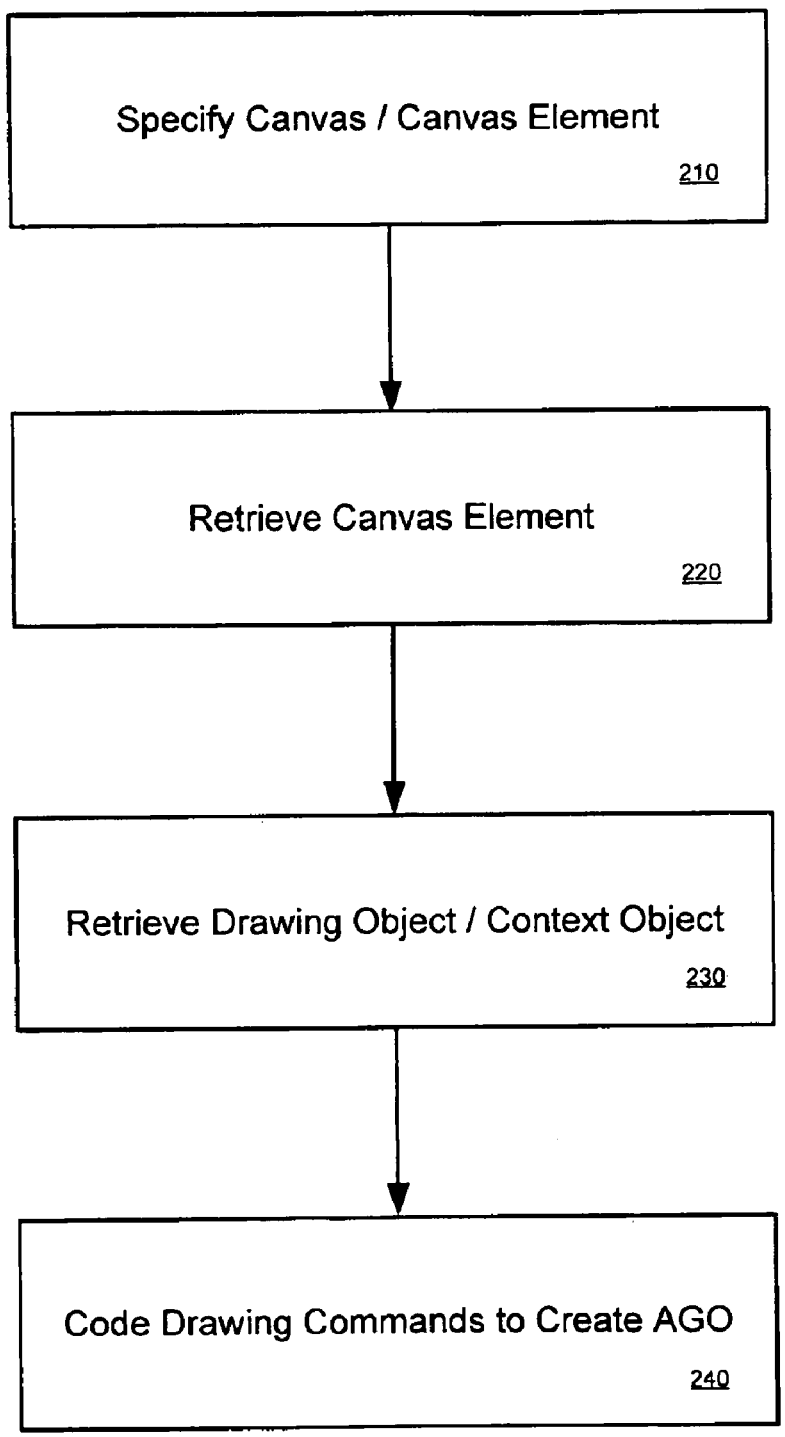
FIG. 2 depicts a flow chart of steps to code a sample AGO into a markup page.

As described above, the AGO can be expressed in both markup and procedural language. FIG. 2 depicts a flow chart of steps to code a sample AGO into a markup page. At a high level, there are four steps in this process. The first is to specify 210 a markup tag for the AGO that defines a two- or three-dimensional graphical space for the AGO, referred to herein as a canvas. In an embodiment, the canvas could potentially be any graphical shape of any dimensions. It could also comprise a bitmap or mask. The markup tag describes the width, height and position in the markup language document of the canvas element. The second is to create a command in procedural language to retrieve 220 the canvas element. From the canvas element a drawing object, known as a context object, is retrieved 230 to perform the drawing functions associated with the AGO. Once creation of the canvas and retrieval of a context object have been specified, the last step is to code 240 drawing commands to create the AGO. For instance, in the case of an exemplary 2-D image for instance, the script specifies a color to be used to draw the outline of the image, then to add lines or curves associated with the image, and then stroke and fill to generate the image.

In an embodiment, the resulting AGO comprises additional graphical, textual, web, or other content described in markup language. The method described above can be modified in order to include this content in at least two ways. In one embodiment, markup language can be embedded inside the canvas element. The step of specifying the canvas element could include specifying child attributes of the canvas element that are associated with the additional content. This could be accomplished using code resembling:

```
<canvas id='mycanvas' width='100' height='100'>
    <div>additional content</div>
    ...
</canvas>
```

In another embodiment, the additional content is added using procedural commands. A method for passing a DOM document object, document fragment, or other content object, for instance, to be rendered inside of the canvas could be defined. A command such as:
Document.getElementById('mycanvas').getContext ("2d").drawDocumentFragment (some_frag, x, y, width, height)
could be used. As one of skill in the art would know, additional content may also be contained in the markup page separately from the canvas element or drawing commands associated therewith, however coding this content in the canvas element has several advantages. These include the ability to procedurally call the content and to define the AGO as a discrete series of canvas commands.

The steps described above could be implemented by directly coding the commands into a scripting language using any markup or text editor. Alternatively, these steps could also be accomplished through use of a graphics toolkit editor. A toolkit editor including a programming or coding engine could translate user inputs into a markup tag specifying the canvas of a certain size and dimension. It could also automatically code retrieval of a context object to carry out the drawing commands. The toolkit could also include a set of pre-generated arbitrary graphic image objects that could be added to the canvas using drag-and-drop functionality. When the pre-generated objects were added, for instance, the toolkit could specify procedural commands to represent the objects. A toolkit could also include various interfaces to represent controls for the management of various parameters.

For instance, a user could use a graphical interface to designate a drawing space with a width and height dimension using any conventional method, for instance by selecting an image of or mathematically defining a shape such as a rectangle, square, or circle. This input would result in the coding of a markup language command for specifying the drawing space. Once a user then specifies an object to be put onto the drawing space, for instance by pre-selecting a dynamic object such as, for example, a clock or billowing clouds, scripting language commands for arbitrarily drawing the graphics object in the drawing space are coded, in an embodiment, by retrieving a drawing object to draw the graphics object.

Figure 5:
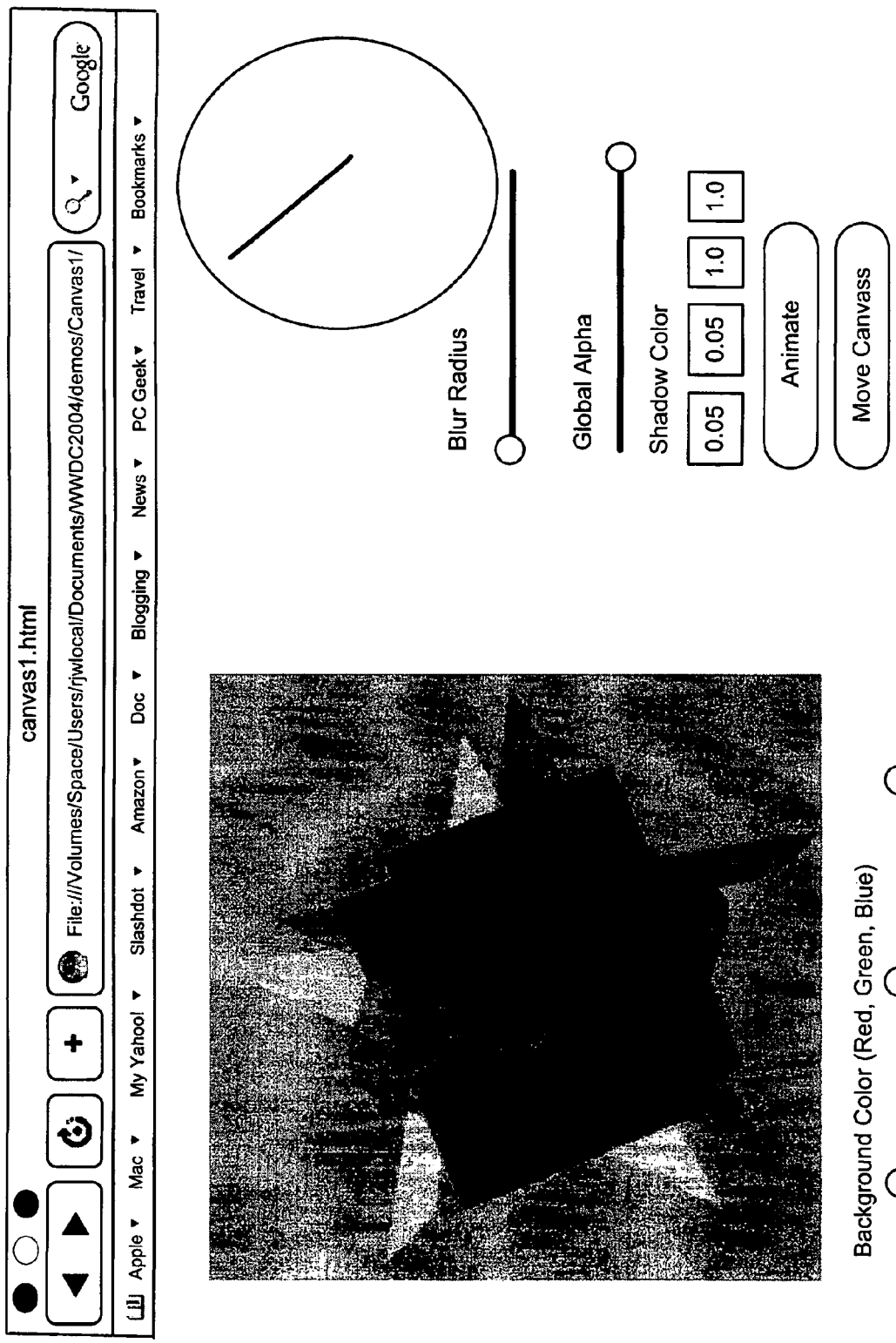
FIG. 5 is a screen shot of a user interface that could be used to create a graphics object.

A screenshot of one tool for managing several parameters to draw an arbitrary graphics object is illustrated in FIG. 5. Using the interface of FIG. 5, keystroke and mouse and keyboard commands entered by the user can be used to change the background colors, control the distance of the offset and the angle of the shadow in the images, alter the blur radius and global alpha channel, move the canvas or drawing space, and animate the images.

Each of the steps of FIG. 2 is described in greater detail below with reference to an embodiment of the invention. As shown, the first step is to specify 210 the canvas element. The canvas element represents a resolution-dependent bitmap canvas, which can be used for rendering graphs, game graphics, or other visual images on the fly. When authors use the canvas element, they also provide content that, when presented to the user, conveys essentially the same function or purpose as the bitmap canvas. This content may be placed as content of the canvas element.

The canvas element may be defined by way of a markup language tag that is included in a markup language page to specify where the user wants drawing to occur. Height and width attributes are defined to control the size of the coordinate space, and in the case of a three-dimensional space, a length dimension is also specified. The value can be expressed either as a fixed number of pixels or a percentage of the window height. An additional id attribute may also be included that specifies a unique value of a canvas object identifier. In an embodiment, the tag may be placed anywhere in the markup language page. More than one canvas may be included in a single web page or widget as long as the id attribute of each is unique. For example, to define a canvas, code such as the following code could be used:

```
<body>
<canvas id="MyCanvas" width='100' height='100'
    style="position:absolute; left:0px; top:0px; z index:1"/>
</body>
```

Once the canvas element has been specified, a command in procedural language is coded to retrieve 220 the canvas element. The canvas attribute returns the canvas element that the context paints on. To draw on the canvas element, in an embodiment, authors first obtain a reference to a context using a getContext method of the canvas element, described in greater detail below. Any of a number of two- and three-dimensional contexts may be defined and used with a getContext method. When the getContext method of a canvas element is invoked, a drawing object known as a context object is returned 230.

In an embodiment, a getContext method may be used to retrieve a 2D context object. In an embodiment, the procedural language is JavaScript and the 2D object manages the graphics state information for the canvas and exposes a set of methods that you can call from your JavaScript code to draw onto the canvas. To obtain an instance of the 2D context object for a particular canvas, the getContext method of the canvas object is called with the string "2D" as a parameter. The following example shows part of a JavaScript function to handle the drawing for a canvas. The function uses the Document Object Model (DOM) to obtain the canvas object and then calls the getContext method to get the 2D context object for the canvas.

```
function MyJavaScriptFunction( )
{
    var canvas = document.getElementById("MyCanvas");
    var context = canvas.getContext("2d");
    //Draw content here...
}
```

In this example, the body of the web page would include a canvas tag whose id attribute was set to "MyCanvas". A separate 2D context object can be obtained for each of multiple canvases on a webpage.

In an embodiment, each canvas maintains a stack of graphics states. A save method may be defined that saves the current graphics state to the top of the graphics state stack. In an embodiment, the following graphics state parameters are saved when the method is called: transformation matrix, the current clip region, and the current values of several attributes, including stroke style (strokeStyle), fill style (fillStyle), alpha value (globalAlpha), the line width (lineWidth), the line cap (lineCap), the line join (lineJoin), the miter limit (miterLimit), and shadow values (shadowOffsetX, shadowOffsetY, shadowBlur, shadowColor). To restore a drawing environment to a previously saved state, a restore method may be specified. When this method is called, the canvas removes the most recently saved graphics state from the top of the stack and uses that state's saved settings for the current graphics state.

Using these methods, the following exemplary set of steps could be used to paint a blue shape, then a green shape, then a blue shape, by saving and restoring the graphics state.

1. Modify the graphics state by changing the fill color to blue.
2. Save the graphics state.
3. Fill a shape—the shape is painted with blue.
4. Set the fill color to green.
5. Fill a shape—the shape is painted with green.
6. Restore the graphics state.
7. Fill a shape—because the graphics state has been restored to the state at the time it was previously saved, the shape is painted blue.

In the embodiment described, not all aspects of the current drawing environment are elements of the saved graphics state. For example, the current path is not saved when the save method is called.

According to an embodiment of the invention, objects drawn can be transformed using a various methods. The current transformation matrix (CTM) specifies the mapping from device-independent user space coordinates to a device space. By modifying the current transformation matrix, objects may be modified, for instance scaled, translated, or rotated. In an embodiment, in order to transform an object in a graphics context, the coordinate space of the context must be transformed by calling a method prior to drawing the object. For example, to rotate an image, a rotate method is called to rotate the coordinate space of the context before drawing the image. The magnitude and direction of the rotation can be set by specifying an angle of adjustment parameter in radians. When the image is drawn, the canvas draws to the window using the rotated coordinate system. To restore the previous coordinate space, the graphics state is saved before modifying the CTM, and restored after drawing. A scale method may also be defined comprising two parameters—an sx parameter containing a float value with the x-axis scale factor and an sy parameter containing a float value with the y-axis scale factor. In addition, a translate method can be used to change the origin of the canvas coordinate system. A tx parameter contains a float value with the x-axis translation value and a ty parameter contains a float value with the y-axis translation value.

Compositing attributes may be used to specify various characteristics of the graphics object. In an embodiment, a GlobalAlpha attribute is defined which specifies the color or style the canvas applies when filling paths. If the fill style comprises a color, it may be set forth in several different ways depending on the color space intended to be used. For web-safe colors, a web color specification string of the form "#RRGGBB", which represents an RGB color using hexidecimal numbers, may be used. To specify an alpha, a CSS rgba (r, g, b, alpha) functional-notation style may be used. Float values between 0 and 255 for the r, g, and b parameters can be specified, and float values between 0.0 and 1.0 indicating the alpha channel value, determine the opacity of the color. Using methods described in further detail below, in an embodiment, a fill style may also comprise a gradient or pattern.

A GlobalCompositeOperation attribute may be defined which determines how the canvas is displayed relative to any background content. A string parameter identifies the desired compositing mode. If this value is not set explicitly, the canvas uses a default compositing mode. Table 1 lists some exemplary compositing operators. When used with this property, the source image refers to the canvas and the destination image refers to the web view.

TABLE 1

| Operator | Description |
| --- | --- |
| Copy | Displays the source image instead of the destination image. |
| Darker | Display the sum of the source image and destination image, with color values approaching 0 as a limit. |
| Destination-atop | Display the destination image wherever both images are opaque. Display the source image wherever the source image is opaque but the destination image is transparent. |
| destination-in | Display the destination image wherever both the destination image and source image are opaque. Display transparency elsewhere. |
| Destination-out | Display the destination image wherever the destination image is opaque and the source image is transparent. Display transparency elsewhere. |
| Destination-over | Display the destination image wherever the destination image is opaque. Display the source image elsewhere. |
| Lighter | Display the sum of the source image and destination image, with color values approaching 1 as a limit. |
| source-atop | Display the source image wherever both images are opaque. Display the destination image wherever the destination image is opaque but the source image is transparent. Display transparency elsewhere. |
| source-in | Display the source image wherever both the source image and destination image are opaque. Display transparency elsewhere. |
| source-out | Display the source image wherever the source image is opaque and the destination image is transparent. Display transparency elsewhere. |
| source-over | Display the source image wherever the source image is opaque. Display the destination image elsewhere. |
| Xor | Exclusive OR of the source and destination images. Works only with black and white images and is not recommended for color images. |

Colors or styles may be applied by the canvas when stroking paths. A strokestyle property may be defined that sets the stroke style parameter of the graphics state. Colors can be set in any of a variety of different ways depending on the color space to be used. For web-safe colors, a web color specification string of the form "#RRGGBB", which represents an RGB color using hexidecimal numbers, may be used. As described above, alpha, gradient or pattern values may also be specified. A fillStyle property may also be used to indicate the alpha channel value representing the opacity of content drawn on the canvas. The range of values could be between 0.0 (fully transparent) and 1.0 (no additional transparency). The canvas uses the alpha value in the current graphics state to determine how to composite newly painted objects.

Various line attributes may also be specified. For instance, a linewidth attribute, defined as a positive, nonzero float value, indicates the line width for drawing operations. The width of lines and curves drawn by the canvas may be controlled by modifying the line width property of the graphics state. The line width is the total width of the line, expressed in units of the user space. The line surrounds the center of the path, with half of the total width on either side. A linecap attribute may also be specified to determine the end style used when drawing a line. In an embodiment, the string "butt" represents a flat edge that is perpendicular to the line itself, the string "round" indicates round endpoints, and "square" for square endpoints. Similarly, a linejoin attribute determines the join style between lines, whether, for example, round, beveled, or miter. In an embodiment, a mitrelimit attribute provides a new miter limit to specify how the canvas draws the juncture between connected line segments. If the line join is set to "miter", the canvas uses the miter limit to determine whether the lines should be joined with a bevel instead of a miter. The canvas divides the length of the miter by the line width. If the result is greater than the miter limit, the style is converted to a bevel.

In an embodiment, the canvas may display a shadow, which can be defined through various attributes. For example, a shadowColor attribute designates the color the canvas applies when displaying a shadow. Setting this property results in the canvas setting the shadow color parameter of the graphics state. The shadow color can be set in several different ways depending on factors such as whether or not the shadow has an opacity. A shadowOffsetX attribute defines the distance, in coordinate space units, that a shadow should be offset in the positive horizontal direction, and a shadowOffsetY attribute defines the distance, in coordinate space units, that a shadow should be offset in the positive vertical direction. A shadow-Blur attribute may be defined that represents the width, in coordinate space units, that a shadow should cover.

Methods may also be defined to draw shapes such as rectangles, squares, and circles to the drawing context. In an embodiment, a clearRect method paints a transparent rectangle. When this method is called, the canvas effectively "erases" the contents of the specified rectangle. The parameters of this method all contain float values. A fillRect method paints the area within the specified rectangle. This method uses the current fill color to paint the area of the specified rectangle. The parameters of this method all contain float values. As a side effect of calling this method, the canvas clears the current path. Finally, a strokeRect method paints an outline of a rectangle. This method uses the current stroke color to paint the path represented by the specified rectangle. The parameters of this method all contain float values. Altering the appearance of the painted outline can be accomplished by modifying attributes of the graphics state including the line width, the line join, the miter limit, the line dash pattern, the stroke color space, and the stroke color.

In an embodiment, a current path is always associated with the context. A path is comprised from a set of subpaths, each of which is a list of one or more segments, either straight lines or curves. A canvas has only a single path in use at any time. Therefore, if the specified context already contains a current path when this method is called, the canvas replaces the previous current path with the new path. Paths may be used to draw both simple shapes (for example, lines, circles, or rectangles) and complex shapes (such as the silhouette of a mountain range) in a canvas. A path can be used to both draw the outline of a shape and fill the inside of a shape. In an embodiment, before painting a shape, the shape is created using the current path.

Several exemplary path methods may be defined. Fr instance a beginPath method creates a new empty path in the canvas. A moveTo method begins a new subpath at a specified point specified with the x and y parameters. The point is defined to be the "current" point, and it defines the starting point of the next line segment. The canvas may set the current point explicitly, when the method is called to begin a new subpath at a given point. Alternatively, the current point may be set implicitly, when a new curve or straight line segment is added to the subpath. After adding the segment, the current point is reset from the beginning of the new segment to the endpoint of that segment. A closePath method closes and terminates an open subpath. When a subpath is open and this method is called, the canvas closes the subpath (draws a straight line that connects the current point to the starting point), and terminates the subpath (the current point is no longer defined). A lineTo method appends a straight line segment from the current point to the point specified.

Straight line segments, cubic and quadratic Bézier curve segments, and rectangles can be used to specify a path. A single straight line segment can be appended to the current subpath using this method. After adding the line segment, the current point is reset from the beginning of the new line segment to the endpoint of that line segment, as specified by the x and y parameters. A quadraticCurveTo method appends a quadratic Bézier curve to the current path. A quadratic curve segment has a start point, one control point, and an endpoint. The start point is the current point of the canvas. The cpx and cpy parameters specify the control point. The x and y parameters specify the new endpoint. After adding the segment, the current point is reset from the beginning of the new segment to the endpoint of that segment. A bezierCurveTo method can be used to append a cubic Bézier curve to the current path. A cubic curve segment has a start point, two control points, and an endpoint. The start point is the current endpoint of the open path. The cp1x, cp1y, cp2x, and cp2y parameters specify the two control points for the path. The x and y parameters specify the new endpoint for the path. After adding the segment, the current point is reset from the beginning of the new segment to the endpoint of that segment.

In an embodiment, an arcTo method adds an arc of a circle to the current subpath, using a radius and tangent points. This method draws an arc that is tangent to the line from the current point to (x1, y1) and to the line from (x1, y1) to (x2, y2). The start and end points of the arc are located on the first and second tangent lines, respectively. The start and end points of the arc are also the "tangent points" of the lines. If the current point and the first tangent point of the arc (the starting point) are not equal, the canvas appends a straight line segment from the current point to the first tangent point. After adding the arc, the current point is reset to the endpoint of the arc (the second tangent point). An arc method adds an arc of a circle to the current subpath. The arc is built based on the circle whose origin and radius are specified by the x, y, and radius parameters. The startAngle parameter specifies the angle of the starting point of the arc, measured in radians from the positive x-axis. The endAngle parameter specifies the angle of the endpoint of the arc, measured in radians from the positive x-axis. If the current path already contains a subpath, the canvas appends a straight line segment from the current point to the starting point of the arc. If the current path is empty, the canvas creates a new subpath for the arc and does not add an initial line segment. After adding the arc, the current point is set to the endpoint of the arc.

A rect method adds a new subpath, consisting of a single rectangle, to the canvas. The parameters for this method all contain float values. A fill method paints the area within the current path, using the nonzero winding-number fill rule. The fill color is an attribute of the graphics state. When the current path is filled, the canvas fills each subpath independently. Any subpath that has not been explicitly closed is closed implicitly by the fill routines. The fill rule used by this method is called the nonzero winding number rule, described in greater detail in Appendix A. A stroke method paints a line along the current path. To modify the behavior of this method, any of a variety of graphics state properties may be changed including line width, line join, line cap, miter limit, line dash pattern, stroke color space, or stroke color. A clip method sets the current clipping path, using the nonzero winding number rule. This method uses the nonzero winding number rule to calculate the intersection of the current path with the current clipping path. The canvas then uses the path resulting from the intersection as the new current clipping path for subsequent painting operations. After determining the new clipping path, the method resets the current path to an empty path.

A drawImage method may be defined to draw images onto the canvas. This method is overloaded with three variants, used to draw the contents of a JavaScript Image object into the context. The first of these, drawImage(image, x, y), draws the image at the x and y coordinates within the context. The image is sized as it is in the object. The second, drawImageFromRect(image, x, y, width, height), is where x, y, width, and height parameters contain integer values representing the bounding rectangle for the image. These values are specified in the coordinate system of the canvas and should always lie wholly within the canvas bounds. If they lie outside the canvas bounds, the image will be clipped. The third method, context.drawImageFromRect(image, sx, sy, swidth, sheight, dx, dy, dwidth, dheight), draws the portion of the image specified by the source rectangle (sx, sy, swidth, and sheight) onto the canvas at the specified destination rectangle (dx, dy, dwidth, dheight). The source rectangle is specified in the image coordinate space and the destination rectangle is specified in the canvas coordinate space. Rectangle coordinates preferably are expressed as integer values. The image parameter must contain a valid JavaScript Image object.

Figure 6:
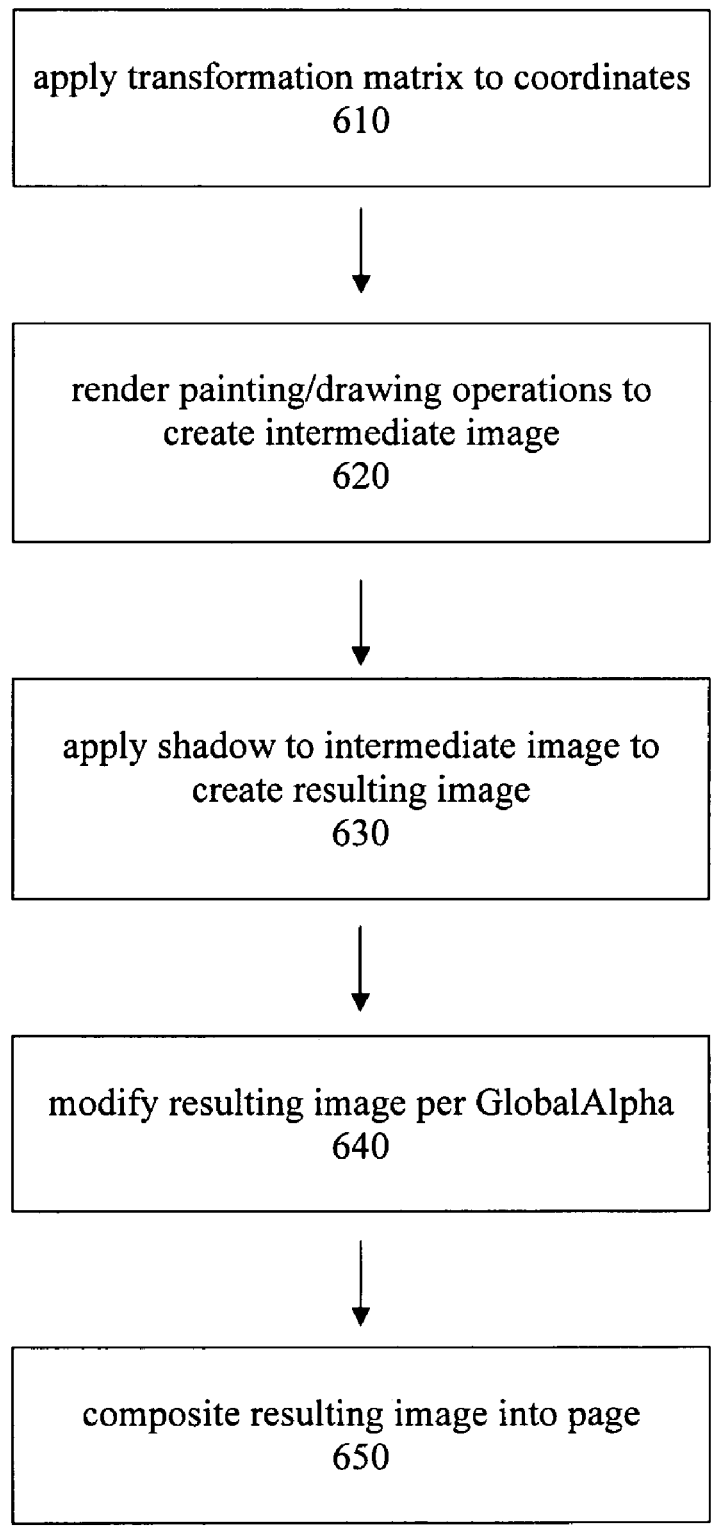
FIG. 6 is a flow chart of the steps for painting an image.

Based on the above, in an embodiment of the invention, when a drawing operation is performed or an image is painted, the sequence depicted in FIG. 6 takes place. The current transformation matrix is applied 610 to the present coordinates, for example, a translation or rotation. The painting operations and/or images are rendered 620 to an intermediate image. Shadow is then applied 630 to the intermediate image, creating a resulting image. The resulting image is then modified 640 according to the GlobalAlpha (i.e. color or style) value. Finally, taking into account the current clip region, the resulting image is composited 650 into the current bitmap or other page using the specified composite operator.

Expressing the World Clock Gadget

Figure 4:
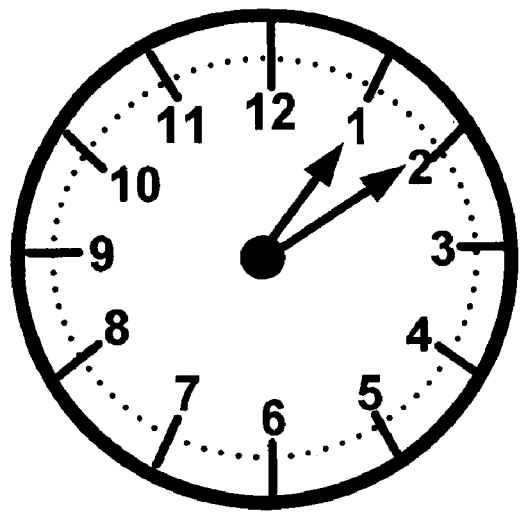
FIG. 4 depicts a sample vector graphics image generated using the techniques described herein.
Figure 4:
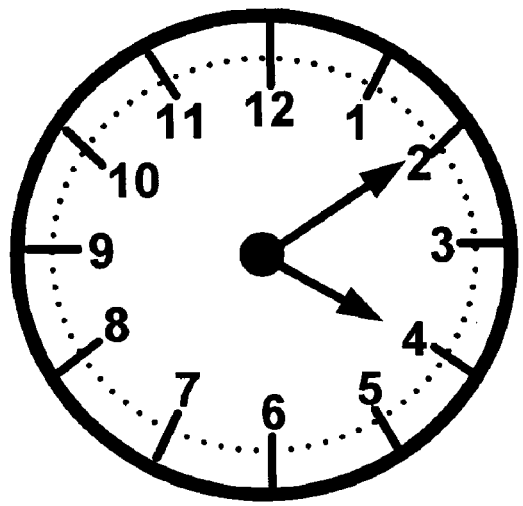

One example for creating a vector graphics object of a World Clock Gadget, several examples of which are illustrated in FIG. 4, is now described in detail. Throughout this disclosure the term "gadget" is used interchangeably with the word "widget." The image generated represents a gadget for use for example in a dashboard. An exemplary dashboard and its functionality is described in the commonly owned and co-pending U.S. patent application entitled "Unified Interest Layer For User Interface", to Chaudhri, et. al. filed Jun. 25, 2004, incorporated by reference in its entirety in this application. As described above, the first step is to set up a drawing region or canvas. The world clock object expresses this region with the following code:

<canvas id='canvas' width='172' height='172'></canvas>

The attributes of the canvas specified are id, width, and height. The id attribute is an arbitrary identifier used to target this particular canvas when drawing. The width and height attributes specify the size of the canvas region. The style attribute specifies the position of the canvas within the context of the gadget.

Next, the code obtains the canvas and its drawing context. The context handles the actual rendering of the content. The World Clock gadget does this in its drawHands( ) function:

```
function drawHands (hoursAngle, minutesAngle, secondsAngle)
{
        var canvas = document.getElementById("canvas");
        var context = canvas.getContext("context-2d");
```

This function draws the hour, minute, and second hands on the face of the World Clock. As parameters, it takes the angles at which the three hands should be rotated as passed in by its caller. After that, it queries the environment for the previously created canvas. It does this using the unique identifier supplied in the id attribute in the <canvas> tag.

Once the canvas has been acquired, its context is obtained via thecanvas.getContext ("context-2d") method and assigned to the context variable. From this point on, all operations intended for the canvas will be called on context.

context.clearRect (0, 0, 172, 172);

The first operation performed on the canvas clears it off. As the drawHands( ) function is called every second, it is important to clear it off each time, so that the previously drawn configuration doesn't conflict with the new configuration. The entire region, as defined in the <canvas> tag, is cleared.

context.save( );

context.translate (172/2, 172/2);

Next, the state of the original context space is saved so that it can be restored later. In the original context, the origin (the 0,0 coordinate) of the canvas is in the lower left corner. Upon completion of the upcoming drawing code, the user may want to return to this context, so it should be saved. The origin of the context space is then translated to the center of the canvas. This is done since the hands of the clock rotate around this point, and to facilitate the drawing commands.

context.save( );

context.rotate (hoursAngle);

context.drawImage (hourhand, −4, −28, 9, 25, "source-over");

context.restore( );

This exemplary code draws the hour hand on the face of the clock. First, a copy of the current context (with the origin at the center of the clock face) is saved, so that it can be restored later. The entire context is then rotated, so that the y-axis aligns itself with the angle that the hour hand should point towards. Then, the hour hand image is drawn. The method drawImage( ) has six parameters: the image to be drawn, the x and y coordinate for the bottom left hand corner of the image, the width and height of the image, and finally, the compositing operation to be used when rendering the image. While the image is drawn as going straight up within the graphics context, the context itself has been rotated to be at the correct angle for the hour hand. While the code shown reflects that a compositing mode parameter is used to implement the drawImage method, as known to one of skill in the art, a user may alternatively set the global compositing property as part of a two- or three-dimensional context.

Once the hand has been drawn, the last saved context is restored. This means that the context that was saved four lines prior, with its origin at the center of the canvas, but not yet rotated, will be the active context again.

```
context.save( );
context.rotate (minutesAngle);
context.drawImage (minhand, -8, -44, 18, 53, "source-
    over");
context.restore( );
```
A similar procedure is used to draw the minute hand on the face of the clock. The differences this time are in the angle the context is rotated to and the size of the minute hand. The context is again saved, rotated, and then restored to its previous state, so that the next element to be drawn can work independent of the rotation needed for the minute hand.

```
context.rotate (secondsAngle);
context.drawImage (sechand, -4, -52, 8, 57, "source-
    over");
```
Finally, the second hand will be drawn. The context does not need to be saved and restored. This is because this is the last time anything will be drawn in this particular context (with the origin at the center of the canvas), so the memory needed to save and restore the context can be saved. Expressing the clock through these commands makes the size of the resulting file smaller than, for instance if the clock were expressed in conventional frame animation techniques and/or through individual images that represented each moment in time.

Rendering an AGO

Figure 3:
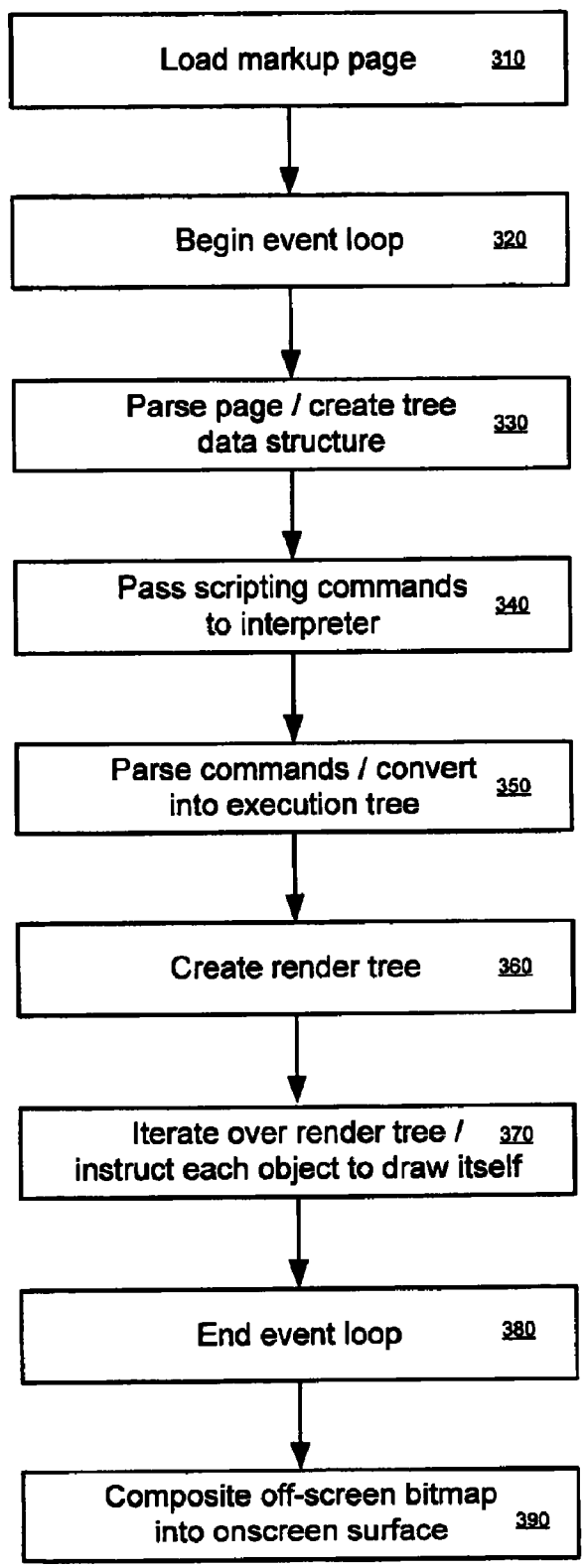
FIG. 3 illustrates the steps performed by a browser to create an AGO in a website during the process of rendering a markup language page.

In an embodiment, an AGO with several distinct elements, such as visual images, timing, and animation effects, has been coded into a markup language page. FIG. 3 illustrates the steps of rendering the AGO in the resulting web page. The page can be interpreted by any application with the ability to interpret markup language. The application may comprise a browser, a graphics application, a game application, a desktop application, or other application. In an embodiment, the markup language page is interpreted by a unified interest layer or dashboard application such as described in U.S. patent application Ser. No. 10/877,968 entitled "Unified Interest Layer For User Interface", to Chaudhri, et. al. filed Jun. 25, 2004. The process begins with loading 310 the markup language page and beginning 320 the event loop. The markup page is parsed 330 and each tag is represented as a DOM (Document Object Model) element in a tree data structure. Each element in the tree is assigned a corresponding rendering object. The parser recognizes the html tag for the canvas elements and scripting commands. The scripting commands associated with code in a script element are passed 340 to the interpreter. The interpreter parses the commands and converts them into an execution tree 350.

Although specifics vary by implementation, the rendering engine will generally create 360 one or more render objects associated with each canvas element in a render tree. The interpreter will evaluate the execution tree and apply commands to the render objects associated with the canvas element. In one embodiment, the context object does this by referring to a mapping between the procedural language and the underlying AGL. In one example, these steps take place in Apple OSX operating environment, the procedural commands are coded in Javascript, and the underlying graphics library is the CoreGraphics library. The graphics commands may exploit the functionality offered by the AGL such as stroking, filling, pathing, rendering curves, transparency, alpha channel management, and other functions described in Appendix B. In the case of a three-dimensional AGO, the commands may include commands to construct a cube or other 3D object, to control the lighting, camera position, textures, and to cast movement shadows.

Once the render object associated with the AGO element has been created, the rendering engine iterates 370 over the tree and instructs 370 each render object to draw itself. The rendering engine draws into an off screen bitmap which represents the canvas elements. Depending on the nature of the AGO, the AG commands may be executed immediately during processing by the AG interpreter to an off screen bitmap. In another embodiment, however, drawing operations are collected during processing and are not applied to the off screen bitmap by the rendering engine until the end of the event loop 380. At the end of the event loop, the off-screen bitmap is composited 390 into the onscreen rendering surface to be displayed. Additional scripting or timing of event loops based on certain triggers or external events is also possible. The compositing step can be performed by pre-existing or emerging compositing technologies.

In a JavaScript implementation, another construct, a JavaScript image object, may exist that can communicate with both the corresponding AGO tree node and AGO render objects. In such an implementation, the step of using the canvas object to draw an image is accomplished by creating a JavaScript image object and then compositing that image into the canvas, thus leveraging the benefits of existing JavaScript technology. One of these benefits includes the capability to send an event when the image is ready to render, which overcomes problems associated with the asynchronous nature of the loading image data over the Internet. However, in other implementations, such as in a Windows or Mozilla or Gecko environment, certain implementation details may be different.

Besides being implemented through the scripting commands in the markup language page, the AGO may be further refined using other markup language constructs such as CSS. Formatting and other commands such as setting a border, setting a border width, positioning, transparency relative to the objects, and establishing a margin may be expressed and implemented on top of the procedural description.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

APPENDIX A

Canvas
Contents:
    Class Description
    Method Types
    Instance Methods
Class Description
    Safari, Dashboard, and any Web Kit-based application can do arbitrary drawing of content using the canvas tag—a Web Kit extension introduced in Mac OS X version 10.4. This extension lets you reserve an area of your web page or widget and use rendering calls like those found in Quartz to paint complex paths and shapes in that area.
Defining the Canvas Space
    The canvas tag is an HTML extension that you include in your HTML page to specify where you want drawing to occur. The canvas tag supports the same attributes as the <img> tag with the exception of the src attribute, which is ignored. You can specify any of the other attributes you would normally specify for an image. At a minimum, you must specify the attributes listed in Table 1.

TABLE 1

Required attributes of <canvas> tag

| Attribute | Description |
|---|---|
| height | Specifies the height of the canvas. You can specify this value in the same way you specify the height of an image, either as a fixed number of pixels or a percentage of the window height. |
| id | Specifies the canvas object identifier. This value must be unique within a given HTML page. |
| width | Specifies the width of the canvas. You can specify this value in the same way you specify the height of an image, either as a fixed number of pixels or a percentage of the window height. |

You can place the canvas tag anywhere in your HTML page. You may also include more than one canvas in your web page or widget as long as the id attribute of each is unique. For example, to define a canvas, you could use code similar to the following body in your HTML page:

```
<body>
  <canvas id="MyCanvas" width='100' height='100'
  style="position:absolute; left:0px; top:0px; z-index:1"/>
</body>
```

Getting a Graphics Context for a Canvas

Each canvas object on a web page is intricately linked to a special JavaScript object called a 2D context object. This object manages the graphics state information for the canvas and exposes a set of methods that you can call from your JavaScript code to draw onto the canvas.

To obtain an instance of the 2D context object for a particular canvas, you must call the getcontext method of the canvas object, passing the string "2d" as a parameter. The following example shows part of a JavaScript function to handle the drawing for a canvas. The function uses the Document Object Model (DOM) to obtain the canvas object and then calls the getContext method to get the 2D context object for the canvas.

```
function MyJavaScriptFunction( )
{
    var canvas = document.getElementById("MyCanvas");
    var context = canvas.getContext("2d");
    //Draw content here...
}
```

In this example, the body of the web page would have to include a canvas tag whose id attribute was set to "MyCanvas". If your web page contained multiple canvases, you would need to acquire a separate 2D context object for each one.

Creating Shapes

When you want to draw a shape, you set the current path to that shape and then paint the shape by stroking, filling, or both stroking and filling. Stroking is the process of painting a line along the current path. Filling is the process of painting the area contained within the path.

You use paths to draw both simple shapes (for example, lines, circles, or rectangles) and complex shapes (such as the silhouette of a mountain range) in a canvas. You can use a path to both draw the outline of a shape and fill the inside of a shape.

The basic steps in building a path are as follows:
1. Start building the path by opening a new path with beginPath.
2. Define the starting point of the new subpath using the moveTo method.
3. Add one or more segments to the subpath using such methods as lineTo and quadraticCurveTo.
4. Repeat steps 2 and/or 3 until the path is defined.
5. Optionally, call closePath to connect the path's start and end points with a straight line.

Prior to building the path, you can paint the path by properties such as fillStyle or strokeStyle.

When you close the path, the canvas connects the end of the last line segment to the start of the first segment and terminates the current subpath. If you don't close the path by calling closePath before painting, the path is implicitly closed for you by drawing primitives that fill or clip (but it is not closed for stroking).

Canvas Properties

Table 2 lists all the editable and readable properties of a Canvas object.

TABLE 2

Canvas properties

| Property | Description |
|---|---|
| context.globalAlpha | The color or style the canvas applies when filling paths. When you set this property, the canvas sets the fill style parameter of the graphics state. If you intend for the fill style to be a color, you can set it in several different ways depending on the color space you intend to use. For web-safe colors, pass a web color specification string of the form "#RRGGBB", which represents an RGB color using hexidecimal numbers. If you want the shape fill to have an alpha, use the CSS rgba(r, g, b, alpha) functional-notation style. Use float values between 0 and 255 for the r, g, and b parameters. The alpha parameter contains a float value, between 0.0 and 1.0, indicating the alpha channel value, which determines the opacity of the color. You can also set the fill style to be a gradient or pattern. Use the createLinearGradient, createRadialGradient, and createPattern methods to define a style that you can apply to this property. |
| context.fillStyle | A float value indicating the alpha channel value, which determines the opacity of content drawn on the canvas. The range of values is between 0.0 (fully transparent) and 1.0 (no additional transparency). By default, this parameter's value is 1.0. The canvas uses the alpha value in the current graphics state to determine how to composite newly painted objects. |
| context.globalCompositeOperation | Determines how the canvas is displayed relative to any background content. The string identifies the desired compositing mode. If you do not set this value explicitly, the canvas uses the source-over compositing mode. Table 3 lists the valid compositing operators. When used with this |

TABLE 2-continued

| Canvas properties | |
|---|---|
| Property | Description |
| | property, the source image refers to the canvas and the destination image refers to the web view. |
| context.lineCap | A string value that determines the end style used when drawing a line. Specify the string "butt" for a flat edge that is perpendicular to the line itself, "round" for round endpoints, or "square" for square endpoints. If you do not set this value explicitly, the canvas uses the "butt" line cap style. |
| context.lineJoin | A string value that determines the join style between lines. Specify the string "round" for round joins, "bevel" for beveled joins, or "miter" for miter joins. If you do not set this value explicitly, the canvas uses the "miter" line cap style. |
| context.lineWidth | A float value indicating the line width for drawing operations. This value must be greater than 0. You can affect the width of lines and curves that the canvas draws by modifying the line width property of the graphics state. The line width is the total width of the line, expressed in units of the user space. The line surrounds the center of the path, with half of the total width on either side. |
| context.miterLimit | A float value with the new miter limit. You use this property to specify how the canvas draws the juncture between connected line segments. If the line join is set to "miter", the canvas uses the miter limit to determine whether the lines should be joined with a bevel instead of a miter. The canvas divides the length of the miter by the line width. If the result is greater than the miter limit, the style is converted to a bevel. |
| context.shadowBlur | Defines the width, in coordinate space units, that a shadow should cover. If you do not set this value explicitly, the canvas uses a value of 0. Any attempts to set this property to a negative value are ignored. |
| context.shadowColor | The color the canvas applies when displaying a shadow. When you set this property, the canvas sets the shadow color parameter of the graphics state.. You can set the shadow color in several different ways depending on whether or not you want to use opacity. For opaque, web-safe colors, pass a web color specification string of the form "#RRGGBB", which represents an RGB color using hexidecimal numbers. If you want the shadow color to have an alpha, use the CSS rgba(r, g, b, alpha) functional-notation style. Use float values between 0 and 255 for the r, g, and b parameters. The alpha parameter contains a float value, between 0.0 and 1.0, indicating the alpha channel value, which determines the opacity of the color. |
| context.shadowOffsetX | Defines the distance, in coordinate space units, that a shadow should be offset in the positive horizontal direction. If you do not set this value explicitly, the canvas uses a value of 0. |
| context.shadowOffsetY | Defines the distance, in coordinate space units, that a shadow should be offset in the positive vertical direction. If you do not set this value explicitly, the canvas uses a value of 0. |
| context.strokeStyle | The color or style the canvas applies when stroking paths. When you set this property, the canvas sets the stroke style parameter of the graphics state. If you intend for the stroke style to be a color, you can set it in several different ways depending on the color space you intend to use. For web-safe colors, pass a web color specification string of the form "#RRGGBB", which represents an RGB color using hexidecimal numbers. If you want the shape stroke to have an alpha, use the CSS rgba(r, g, b, alpha) functional-notation style. Use float values between 0 and 255 for the r, g, and b parameters. The alpha parameter contains a float value, between 0.0 and 1.0, indicating the alpha channel value, which determines the opacity of the color. You can also set the stroke style to be a gradient or pattern. Use the createLinearGradient, createRadialGradient, and createPattern methods to define a style that you can apply to this property. |

Table 3 describes the operators supported by the context.globalCompositeOperation property. Use these to define the compositing operators for the canvas object.

TABLE 3

| Composite operators used by the globalCompositeOperation property | |
|---|---|
| Operator | Description |
| Copy | Displays the source image instead of the destination image. |
| Darker | Display the sum of the source image and destination image, with color values approaching 0 as a limit. |
| destination-atop | Display the destination image wherever both images are opaque. Display the source image wherever the source image is opaque but the destination image is transparent. |
| destination-in | Display the destination image wherever both the destination image and source image are opaque. Display transparency elsewhere. |
| destination-out | Display the destination image wherever the destination image is opaque and the source image is transparent. Display transparency elsewhere. |
| destination-over | Display the destination image wherever the destination image is opaque. Display the source image elsewhere. |
| Lighter | Display the sum of the source image and destination image, with color values approaching 1 as a limit. |
| source-atop | Display the source image wherever both images are opaque. Display the destination image wherever the destination image is opaque but the source image is transparent. Display transparency elsewhere. |
| source-in | Display the source image wherever both the source image and destination image are opaque. Display transparency elsewhere. |
| source-out | Display the source image wherever the source image is opaque and the destination image is transparent. Display transparency elsewhere. |
| source-over | Display the source image wherever the source image is opaque. Display the destination image elsewhere. |
| Xor | Exclusive OR of the source and destination images. Works only with black and white images and is not recommended for color images. |

Method Types
  Canvas State Methods
    restore
    rotate
    save
    scale
    translate
  Working With Paths
    arc
    arcTo
    bezierCurveTo
    beginPath
    clip
    closePath
    lineTo
    moveTo
    quadraticCurveTo
    rect
  Stroking a Path
    stroke
    strokeRect
  Filling an Area
    clearRect
    fill
    fillRect
  Creating Gradient and Pattern Styles
    addColorStop
    createLinearGradient
    createPattern
    createRadialGradient
  Drawing an Image
    drawImage
  Instance Methods
    addColorStop
    context.addColorStop(offset, color)

Adds a color at an offset point to a gradient. The offset is a float value between 0.0 and 1.0, and is defined within the context of the gradient type. Any values less than 0 or greater than 1 is ignored.

Arc
  context.arc(x, y, radius, startAngle, endAngle, clockwise)

Adds an arc of a circle to the current subpath. The arc is built based on the circle whose origin and radius are specified by the x, y, and radius parameters. The startAngle parameter specifies the angle of the starting point of the arc, measured in radians from the positive x-axis. The endAngle parameter specifies the angle of the endpoint of the arc, measured in radians from the positive x-axis. Specify 1 for the clockwise parameter to draw the arc in a clockwise direction; otherwise, specify 0.

If the current path already contains a subpath, the canvas appends a straight line segment from the current point to the starting point of the arc. If the current path is empty, the canvas creates a new subpath for the arc and does not add an initial line segment. After adding the arc, the current point is set to the endpoint of the arc.

arcTo
  context.arcTo(x1, y1, x2, y2, radius)

Adds an arc of a circle to the current subpath, using a radius and tangent points. This method draws an arc that is tangent to the line from the current point to (x1, y1) and to the line from (x1, y1) to (x2, y2). The start and end points of the arc are located on the first and second tangent lines, respectively. The start and end points of the arc are also the "tangent points" of the lines.

If the current point and the first tangent point of the arc (the starting point) are not equal, the canvas appends a straight line segment from the current point to the first tangent point. After adding the arc, the current point is reset to the endpoint of the arc (the second tangent point).

bezierCurveTo
  context.bezierCurveTo(cp1x, cp1y, cp2x, cp2y, x, y)

Appends a cubic Bézier curve to the current path. A cubic curve segment has a start point, two control points, and an endpoint. The start point is the current endpoint of the open path. The cp1x, cp1y, cp2x, and cp2y parameters specify the two control points for the path. The x and y parameters specify the new endpoint for the path. After adding the segment, the current point is reset from the beginning of the new segment to the endpoint of that segment.

beginPath
  context.beginPath( )

Creates a new empty path in the canvas. You use paths to draw both simple shapes (for example, lines, circles, or rectangles) and complex shapes (such as the silhouette of a mountain range) in a canvas. You can use a path to both draw the outline of a shape and fill the inside of a shape.

Before painting a shape, you must create the shape to be painted using the current path. You build a path from a set of subpaths, each of which is a list of one or more segments, either straight lines or curves.

A canvas can have only a single path in use at any time. Therefore, if the specified context already contains a current path when you call this method, the canvas replaces the previous current path with the new path. In this case, the canvas discards the old path and any data associated with it.

Note: The current path is not part of the graphics state. Consequently, saving and restoring the graphics state has no effect on the current path.

context.clearRect(x, y, width, height)

Paints a transparent rectangle. When you call this method, the canvas effectively "erases" the contents of the specified rectangle. The parameters of this method all contain float values.

clip
  context.clip( )

Sets the current clipping path, using the nonzero winding number rule. This method uses the nonzero winding number rule to calculate the intersection of the current path with the current clipping path. The canvas then uses the path resulting from the intersection as the new current clipping path for subsequent painting operations.

Unlike the current path, the current clipping path is part of the graphics state. Therefore, to re-enlarge the paintable area by restoring the clipping path to a prior state, you must save the graphics state before you clip and restore the graphics state after you've completed any clipped drawing.

After determining the new clipping path, the method resets the current path to an empty path.

closePath
  context.closePath( )

Closes and terminates an open subpath. When a subpath is open and you call this method, the canvas closes the subpath (draws a straight line that connects the current point to the starting point), and terminates the subpath (the current point is no longer defined).

If no subpath is open, calling this method does nothing.

Note: You can stroke along an open subpath. When a subpath is open and you fill or clip, however, the canvas implicitly closes the subpath for you.

createLinearGradient
  context.createLinearGradient(x0, y0, x1, y1)

Returns a gradient object representing a linear gradient. This method takes in two coordinates, (x0, y0) and (x1, y1), and returns an object that represents a gradient between them.

Use addColorStop( ) to add colors and offsets to a gradient. The 0 offset in this case is the start of the gradient (x0, y0) while the 1 offset is the end of the gradient (x1, y1).

The returned object can be assigned to the fillStyle and strokeStyle properties or used in comparisons with them.
createPattern
context.createLinearGradient(image, repetition)

Returns a pattern object representing a repeating pattern. This method takes in a image and a repetition style and produces a pattern style that you can use when filling in your shapes. The repetition parameter accepts a string as its value:

TABLE 4

Possible values for createPattern's repetition parameter

| Value | Description |
| --- | --- |
| "repeat" | Repeat the image in both the x and y directions. |
| "repeat-x" | Repeat the image in the x direction. |
| "repeat-y" | Repeat the image in the y direction. |
| "no-repeat" | Do not repeat the image beyond showing it once. |

The returned object can be assigned to the fillStyle and strokeStyle properties or used in comparisons with them.
createRadialGradient
context.createLinearGradient(x0, y0, r0, x1, y1, r1)

Returns a gradient object representing a radial gradient. This method takes in two coordinates, (x0, y0) and (x1, y0) and corresponding radii. It creates two circles using the coordinates and the radii provided and returns an object that has a gradient between the edges of the circles.

Use addColorStop( ) to add colors and offsets to a gradient. The 0 offset in this case is the circumference of the first circle (x0, y0, r0) while the 1 offset is the circumference of the second circle (x1, y1, r1).

The returned object can be assigned to the fillStyle and strokeStyle properties or used in comparisons with them.
drawImage
context.drawImage(image, x, y)
context.drawImageFromRect(image, x, y, width, height)
context.drawImageFromRect(image, sx, sy, swidth, sheight, dx, dy, dwidth, dheight)

Draws an image in the specified rectangle. This method is overloaded with three variants, used to draw the contents of a JavaScript Image object into the context.

The first of these, drawImage(image, x, y), draws the image at the x and y coordinates within the context. The image is sized as it is in the object.

The second, drawImageFromRect(image, x, y, width, height), is where x, y, width, and height parameters contain integer values representing the bounding rectangle for the image. These values are specified in the coordinate system of the canvas and should always lie wholly within the canvas bounds. If they lie outside the canvas bounds, the image will be clipped.

The third method, context.drawImageFromRect(image, sx, sy, swidth, sheight, dx, dy, dwidth, dheight), draws the portion of the image specified by the source rectangle (sx, sy, swidth, and sheight) onto the canvas at the specified destination rectangle (dx, dy, dwidth, dheight). The source rectangle is specified in the image coordinate space and the destination rectangle is specified in the canvas coordinate space. You should specify the rectangle coordinates as integer values. The image parameter must contain a valid JavaScript Image object.

fill context.fill( )

Paints the area within the current path, using the nonzero winding-number fill rule. The fill color is an attribute of the graphics state. You can set the current fill color by setting a value for the fillStyle property.

When you fill the current path, the canvas fills each subpath-independently. Any subpath that has not been explicitly closed is closed implicitly by the fill routines.

The fill rule used by this method is called the nonzero winding number rule. To understand how this rule works, draw a line in any direction, starting from the given point and moving to infinity. Starting with a count of zero, add one to the count every time a path segment crosses the line from left to right, and subtract one every time a path segment crosses the line from right to left. If the result is zero, the point is outside the path and is not filled.

fillRect context.fillRect(x, y, width, height)

Paints the area within the specified rectangle. This method uses the current fill color to paint the area of the specified rectangle. The parameters of this method all contain float values.

As a side effect of calling this method, the canvas clears the current path.

lineTo context.lineTo(x, y)

Appends a straight line segment from the current point to the point you specify. You can use straight line segments, cubic and quadratic Bézier curve segments, and rectangles to specify a path. You can append a single straight line segment to the current subpath using this method. After adding the line segment, the current point is reset from the beginning of the new line segment to the endpoint of that line segment, as specified by the x and y parameters.

moveTo context.moveTo(x, y)

Begins a new subpath at the point you specify. Before painting a shape in the canvas, you must create the shape to be painted using the current path. You build a path from a set of subpaths, each of which is a list of one or more segments, either straight lines or curves. This method begins a new subpath starting at the point you specify with the x and y parameters. This point is defined to be the "current" point, and it defines the starting point of the next line segment. The canvas sets the current point in one of two ways:

Explicitly, when you call this method to begin a new subpath at a given point

Implicitly, when you add a new curve or straight line segment to the subpath; after adding the segment, the current point is reset from the beginning of the new segment to the endpoint of that segment quadraticCurveTo context.quadraticCurveTo(cpx, cpy, x, y)

Appends a quadratic Bézier curve to the current path. A quadratic curve segment has a start point, one control point, and an endpoint. The start point is the current point of the canvas. The cpx and cpy parameters specify the control point.

The x and y parameters specify the new endpoint. After adding the segment, the current point is reset from the beginning of the new segment to the endpoint of that segment.

context.rect(x, y, width, height)

Adds a new subpath, consisting of a single rectangle, to the canvas. The parameters for this method all contain float values.

restore context.restore( )

Restores the current graphics state to the state most recently saved. If you wish to save the settings of the current drawing environment, that is, the current graphics state, you can call the save method. When you call save, the canvas saves the current graphics state to the top of the graphics state stack.

To restore your drawing environment to a previously saved state, you can use this method. When you call restore, the canvas removes the most recently saved graphics state from the top of the stack and uses that state's saved settings for the current graphics state.

rotate context.rotate(angle)

Rotates the user coordinate system of the canvas. The angle parameter specifies the amount of coordinate-space rotation and is measured in radians.

The current transformation matrix (CTM) specifies the mapping from device-independent user space coordinates to a device space. By modifying the current transformation matrix, you can modify (scale, translate, rotate) the objects you draw. It's important to note the order of events necessary to transform an object in a graphics context. Prior to drawing the object, you must first transform the coordinate space of the context (by calling this method), and then draw the object.

For example, to rotate an image, you must call this method to rotate the coordinate space of the context before drawing the image. When you draw the image, the canvas draws to the window using the rotated coordinate system. You specify both the magnitude and direction of the rotation by specifying an angle of adjustment in radians.

To restore the previous coordinate space, you must save the graphics state before modifying the CTM, and restore the graphics state after drawing.

save context.save( )

Saves a copy of the current graphics state. The graphics state contains data describing the current drawing environment. Methods that draw to the canvas use the graphics state settings to determine how to render their results.

Each canvas maintains a stack of graphics states. If you wish to save the settings of the current drawing environment, that is, the current graphics state, you can call the save method. When you call save, the canvas object saves the current graphics state to the top of the graphics state stack.

To restore your drawing environment to a previously saved state, you can use the restore method. When you call restore, the canvas removes the most recently saved graphics state from the top of the stack and uses that state's saved settings for the current graphics state. For example, you could use the following set of steps to paint a blue shape, then a green shape, then a blue shape, by saving and restoring the graphics state.

1. Modify the graphics state by changing the fill color to blue.
2. Save the graphics state.
3. Fill a shape—the shape is painted with blue.
4. Set the fill color to green.
5. Fill a shape—the shape is painted with green.
6. Restore the graphics state.
7. Fill a shape—because the graphics state has been restored to the state at the time it was previously saved, the shape is painted blue.

Note that not all aspects of the current drawing environment are elements of the graphics state. For example, the current path is not considered part of the graphics state and is therefore not saved when you call this method.

The graphics state parameters that are saved when you call this method include the following:

The CTM (current transformation matrix)
The clip region
The line width
The line join
The miter limit
The line cap
The flatness
The fill color
The stroke color
The alpha value
The shadow parameters
scale context.scale(sx, sy)

Changes the scale of the canvas coordinate system. The sx parameter contains a float value with the x-axis scale factor. The sy parameter contains a float value with the y-axis scale factor.

The current transformation matrix (CTM) specifies the mapping from device-independent user space coordinates to a device space. By modifying the current transformation matrix, you can modify (scale, translate, rotate, skew) the objects you draw. It is important to note the order of events necessary to transform an object in a graphics context. Prior to drawing the object, you must first transform the coordinate space of the context (by calling this method), and then draw the object.

Scaling operations modify the x- and y-coordinates by a given scaling factor. The magnitude of the x and y factors governs whether the new coordinates are larger or smaller than the original. For example, specifying the value 2.0 for the sx parameter causes subsequently drawn objects to appear at twice their specified width. In addition, by making the x factor negative, you can flip the coordinates about the y-axis; similarly, you can flip coordinates about the x-axis by making the y factor negative.

To restore the previous coordinate space, you must save the graphics state before modifying the CTM, and restore the graphics state after drawing.

stroke context.stroke( )

Paints a line along the current path. To modify the behavior of this method, you can change any of the following graphics state properties:

The line width
The line join
The line cap
The miter limit
The line dash pattern
The stroke color space
The stroke color
strokeRect context.strokeRect(x, y, width, height)

Paints an outline of a rectangle. This method uses the current stroke color to paint the path represented by the specified rectangle. The parameters of this method all contain float values.

To alter the appearance of the painted outline, you can modify the following attributes of the graphics state:
The line width
The line join
The miter limit
The line dash pattern
The stroke color space
The stroke color
translate
context.translate(tx, ty)

Changes the origin of the canvas coordinate system. The tx parameter contains a float value with the x-axis translation value. The ty parameter contains a float value with the y-axis translation value.

The current transformation matrix (CTM) specifies the mapping from device-independent user space coordinates to a device space. By modifying the current transformation matrix, you can modify (scale, translate, rotate) the objects you draw. It's important to note the order of events necessary to transform an object in a graphics context. Prior to drawing the object, you must first transform the coordinate space of the page (by calling this method), and then draw the object.

This method displaces the x- and y-axes (thus, the origin) of the coordinate system by the values you specify. When you draw into this adjusted coordinate space, the x- and y-coordinates of your drawing are also displaced.

To restore the previous coordinate space, you must save the graphics state before modifying the CTM, and restore the graphics state after drawing.

We claim:

1. A computer-implemented method of drawing an arbitrary graphics object in a web page, the method comprising:
accessing, by a web browser, a file including coded markup language that specifies a drawing space as an extent within the web page and coded procedural language that specifies a drawing command to draw the arbitrary graphics object in the drawing space in the web page;
creating the drawing space within the web page using the coded markup language; and
drawing, by the web browser, the arbitrary graphics object into the drawing space within the web page using the coded procedural language.

2. The method of claim 1, wherein creating the drawing space comprises executing a retrieving command in the procedural language to retrieve an arbitrary graphics command from a library of graphics commands to create the drawing space.

3. The method of claim 1, further comprising responsive to the coded procedural command comprising a context command, retrieving a drawing object for performing the drawing command.

4. The method of claim 3, wherein the drawing object maintains a drawing state.

5. The method of claim 4, wherein the drawing state comprising at least one of: a transformation matrix, a clip region, and a value of a graphics object attribute.

6. The method of claim 5, wherein the graphics object attribute comprises at least one of: a color attribute, a style attribute, a line attribute, a shadow attribute, and a drawing attribute.

7. The method of claim 1, wherein the coded markup language further specifies a styling to be applied to the arbitrary graphics object using a content style sheet.

8. The method of claim 1, wherein the drawing command comprises a call to a library of graphics commands for rendering the arbitrary graphics object.

9. The method of claim 1, wherein the coded markup language comprises a coded markup tag specifying the drawing space.

10. The method of claim 1, wherein the file is created using a markup editor.

11. The method of claim 1, wherein the drawing space comprises a two-dimensional drawing space.

12. The method of claim 1, wherein the drawing space comprises a three-dimensional drawing space.

13. The method of claim 1, wherein the markup language is one of hypertext markup language, extensible hypertext markup language, and extensible markup language.

14. The method of claim 1, wherein the procedural language is one of Javascript, Python, and Visual Basic.

15. The method of claim 1, wherein the drawing command is one of a vector graphics command and an OpenGL command.

16. The method of claim 1, wherein the drawing command consists of at least one of a shape drawing command, a masking command, a pathing command, a transparency command, and a fill command.

17. The method of claim 1, wherein the file further includes an association of a procedural language command with at least one arbitrary drawing function implemented by a graphics language command to draw the arbitrary graphics object in the drawing space.

18. The method of claim 17, wherein the file further includes a command to retrieve the drawing space on which the procedural language command can be performed.

19. The method of claim 18, wherein the drawing space comprises a two-dimensional drawing space.

20. The method of claim 19, wherein the drawing space comprises a three-dimensional drawing space.

21. The method of claim 17, wherein the file further includes a command to retrieve the drawing object to perform the procedural language command.

22. The method of claim 21, wherein the drawing object maintains a drawing state.

23. The method of claim 22, wherein the drawing state consists of at least one of: a transformation matrix, a clip region, and a value of a graphics object attribute.

24. The method of claim 17, wherein the at least one arbitrary drawing function comprises one of: a pathing function, a filling function, a stroking function, a curve-drawing function, a line-drawing function, a rotating function, a compositing function, a coloring function, a style function, a shadowing function, and a shape function.

25. The method of claim 17, wherein the graphics language command is one of a vector graphics command and an OpenGL command.

26. The method of claim 17, wherein the procedural language command calls a graphics command of a library of graphics commands for arbitrarily rendering the arbitrary graphics object.

27. The method of claim 17, wherein the procedural language is one of Javascript, Python, and Visual Basic.

28. A computer program product comprising a non-transitory computer readable storage medium and computer program instructions encoded on the storage medium for drawing an arbitrary graphics object in a web page, the computer program instructions when executed by a processor perform the steps of:
accessing, by a web browser, a file including markup language that specifies a drawing space as an extent within the web page and coded procedural language that specifies a drawing command to draw the arbitrary graphics object in the drawing space in the web page;

creating the drawing space within the web page using the coded markup language; and drawing, by the web browser, the arbitrary graphics object into the drawing space within the web page using the coded procedural language.

29. The computer program product of claim 28, wherein creating the drawing space comprises executing an instruction for specifying a command in the procedural language to retrieve an arbitrary graphics command from a library of graphics commands to create the drawing space.

30. The computer program product of claim 28, further comprising responsive to the coded procedural command comprising a context command, retrieving a drawing object for performing the drawing command.

31. The computer program product of claim 30, wherein the drawing object supports a drawing state, the drawing state comprising at least one of: a transformation matrix, a clip region, and a value of an arbitrary graphics object attribute.

32. The computer program product of claim 31, wherein the graphics object attribute consists of at least one of: a color attribute, a style attribute, a line attribute, a shadow attribute, and a drawing attribute.

33. The computer program product of claim 28, wherein the coded markup language further specifies a styling to be applied to the graphics object using a content style sheet.

34. A system for drawing an arbitrary graphics object in a web page, the system comprising:

a processor; and a computer-readable storage medium comprising computer program instructions, the instructions when executed by the processor are configured to:

access, by a web browser, a file including coded markup language that specifies a drawing spaces as an extent within the web page and coded procedural language that specifies a drawing command to draw the arbitrary graphics object in the drawing space in the web page;

create the drawing space within the web page using coded markup language; and drawing, by the web browser, the arbitrary graphics object into the drawing space within the web page using the coded procedural language.

35. The system of claim 34, wherein the processor is further configured for associating a procedural language command with at least one arbitrary drawing function implemented by a graphics language command responsive to user input.

\* \* \* \* \*